United States Patent
Su

(10) Patent No.: US 12,143,593 B2
(45) Date of Patent: Nov. 12, 2024

(54) CHAINED RESHAPING FUNCTION OPTIMIZATION

(71) Applicant: Dolby Laboratories Licensing Corporation, San Francisco, CA (US)

(72) Inventor: Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/566,803

(22) PCT Filed: Jun. 1, 2022

(86) PCT No.: PCT/US2022/031767
§ 371 (c)(1),
(2) Date: Dec. 4, 2023

(87) PCT Pub. No.: WO2022/260902
PCT Pub. Date: Dec. 15, 2022

(65) Prior Publication Data
US 2024/0267530 A1    Aug. 8, 2024

Related U.S. Application Data

(60) Provisional application No. 63/208,190, filed on Jun. 8, 2021.

(30) Foreign Application Priority Data

Jun. 8, 2021  (EP) ..................................... 21178180

(51) Int. Cl.
*H04N 19/146*    (2014.01)
*H04N 19/105*    (2014.01)
*H04N 19/186*    (2014.01)

(52) U.S. Cl.
CPC ......... *H04N 19/146* (2014.11); *H04N 19/105* (2014.11); *H04N 19/186* (2014.11)

(58) Field of Classification Search
CPC ............ G06T 2207/20208; G06T 5/90; H04N 19/117; H04N 19/159; H04N 19/186; H04N 19/98; H04N 19/44
See application file for complete search history.

(56) References Cited

U.S. PATENT DOCUMENTS 8,811,490 B2   8/2014  Su
10,080,026 B2  9/2018  Su
(Continued)

FOREIGN PATENT DOCUMENTS

WO   2012125802 W    9/2012
WO   2017011636 A1   1/2017
(Continued)

OTHER PUBLICATIONS

"High Dynamic Range Video Coding with Backward Compatibility"—Rusanovskyy et al.; 2016 Data Compression Conference; DOI 10.1109/DCC.2016.78; 1068-0314/16 $31.00 A © 2016 IEEE. (Year: 2016).*
(Continued)

*Primary Examiner* — Mainul Hasan

(57) ABSTRACT

An input image to a pipeline of chained reshaping functions is received. Reference images are generated from the input image. The input image and the reference images are used to determine operational parameters for chained reshaping functions in the pipeline of chained reshaping functions. A reshaped image generated from one or more of the chained reshaping functions is encoded in a video signal along with image metadata. The image metadata includes some or all of the operational parameters specifying the chained reshaping functions. A recipient device of the video signal is caused to (Continued)

use the image metadata and the reshaped image to generate a reconstructed image.

15 Claims, 11 Drawing Sheets

(56) References Cited

U.S. PATENT DOCUMENTS

| | | | |
|---|---|---|---|
| 2017/0085889 A1* | 3/2017 | Baylon | H04N 19/44 |
| 2017/0111643 A1* | 4/2017 | Bugdayci Sansli | H04N 19/184 |
| 2017/0221189 A1 | 8/2017 | Kheradmand | |
| 2018/0098094 A1 | 4/2018 | Wen | |
| 2018/0167637 A1 | 6/2018 | Yin | |
| 2018/0278967 A1* | 9/2018 | Kerofsky | H04N 19/98 |
| 2019/0110054 A1 | 4/2019 | Su | |

FOREIGN PATENT DOCUMENTS

| | | | |
|---|---|---|---|
| WO | WO-2017015564 A1 * | 1/2017 | H04N 19/117 |
| WO | 2017024042 A2 | 2/2017 | |
| WO | 2017053432 A1 | 3/2017 | |
| WO | 2018005705 W | 1/2018 | |
| WO | 2021067204 A1 | 4/2021 | |
| WO | 2021108719 A1 | 6/2021 | |
| WO | 2021216767 A1 | 10/2021 | |

OTHER PUBLICATIONS

Francois, E. et al: "HDR CE2-related: some experiments on ETM with dual grading input", Joint Collaborative Team on Video Coding (JCT-VC) of ITU-T SG 16 WP 3. 15 pages.

He, Kaiming, Jian Sun, and Xiaoou Tang. "Guided image filtering." IEEE transactions on pattern analysis and machine intelligence 35, No. 6 (2012): 1397-1409. 13 pages.

ITU Rec. ITU-R BT. 1886, "Reference electro-optical transfer function for flat panel displays used in HDTV studio production," (Mar. 2011). 7 pages.

ITU Rec. ITU-R BT.2020-2, "Parameter values for ultra-high definition television systems for production and international programme exchange," (Oct. 2015). 8 pages.

Minoo (Arris) Ket al: "Description of the reshaper parameters derivation process in ETM reference software", 23. JCT-VC Meeting; Feb. 19, 2016-Feb. 26, 2016; San Diego; (Joint Collaborative Team on Video Coding of ISO/IEC JTC1/SC29/WG11 and ITU-T SG.16 ); URL: http://wftp3.itu.int/av-arch/jctvc-site/,, No. JCTVC-W0031, Jan. 11, 2016 (Jan. 11, 2016), XP030117798. 17 pages.

Olivier Yet al: "HOR CE2-related: some experiments on ETM with dual grading input", 23. JCT-VC Meeting; Feb. 19, 2016-Feb. 26, 2016; San Diego, USA; (Joint Collaborative Team on Video Coding of ISO/IEC JTC1/SC29/WG11 and ITU-T SG. 16 ), ITU, ISO, IEC, CH, vol. JCTVC-W0089, No. JCTVC-W0089 Feb. 15, 2016 (Feb. 15, 2016), pp. 1-15, XP030117867. 15 pages.

Rec. ITU-R BT.2100, "Image parameter values for high dynamic range television for use in production and international programme exchange," (Jun. 2017) 16 pages.

SMPTE EG 432-1:2010 "Digital Source Processing—Color Processing for D-Cinema" (Nov. 10, 2010) 81 pages.

SMPTE RP 431-2:2011 "D-Cinema Quality—Reference Projector and Environment" (Apr. 6, 2011). 14 pages.

SMPTE ST 2084:2014 "High Dynamic Range EOTF of Mastering Reference Displays". 15 pages.

SMPTE ST 2094, "Dynamic Metadata for Color Volume Transform (DMCVT)," (2016). 15 pages.

Wells, William M. "Efficient synthesis of Gaussian filters by cascaded uniform filters." IEEE Transactions on Pattern Analysis and Machine Intelligence 2 (1986): 234-239. 6 pages.

Zhang, Shifeng, Xiangyu Zhu, Zhen Lei, Hailin Shi, Xiaobo Wang, and Stan Z. Li. "Faceboxes: A CPU real-time face detector with high accuracy." In 2017 IEEE International Joint Conference on Biometrics (IJCB), pp. 1-9. IEEE, 2017. 9 pages.

* cited by examiner

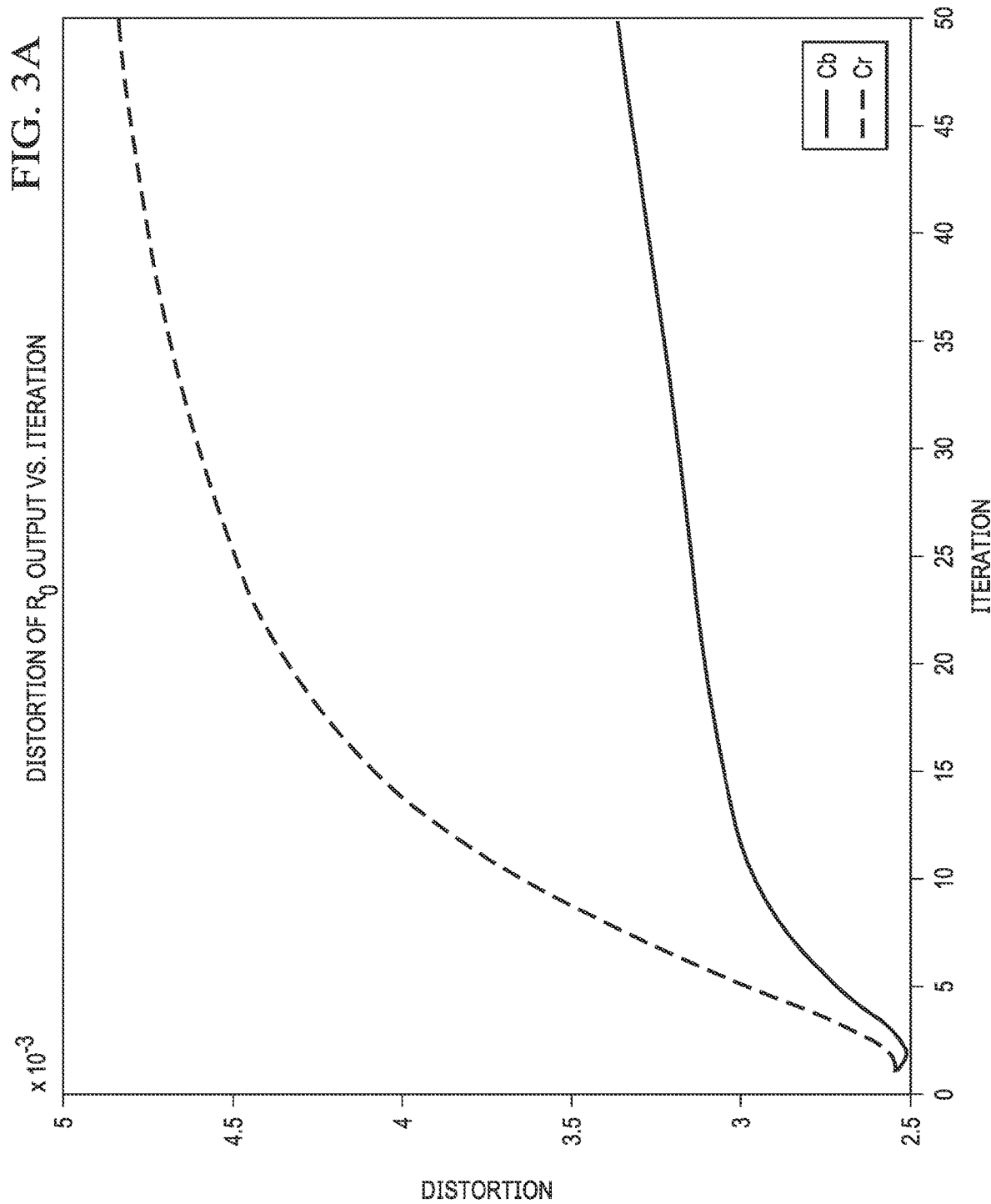

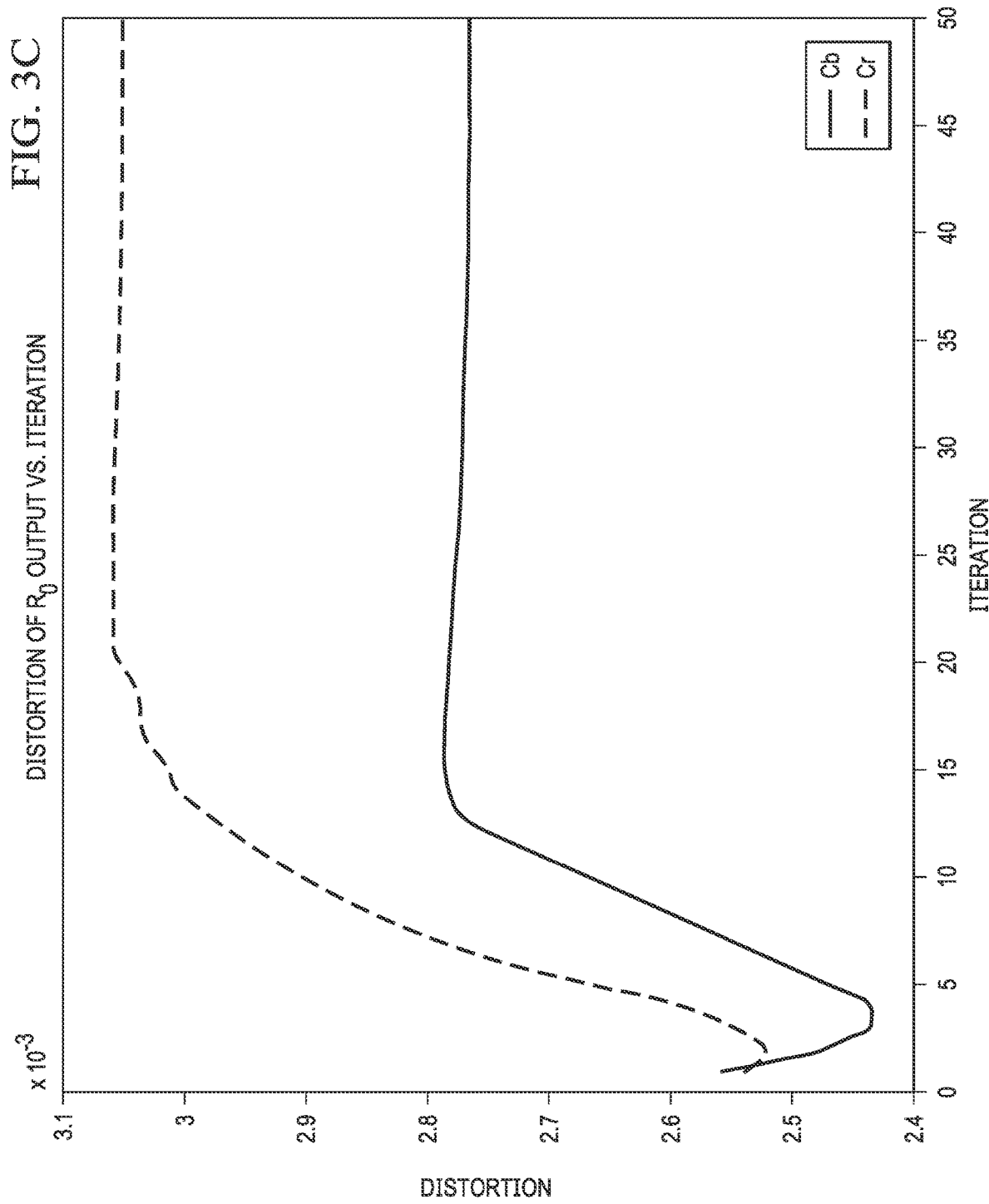

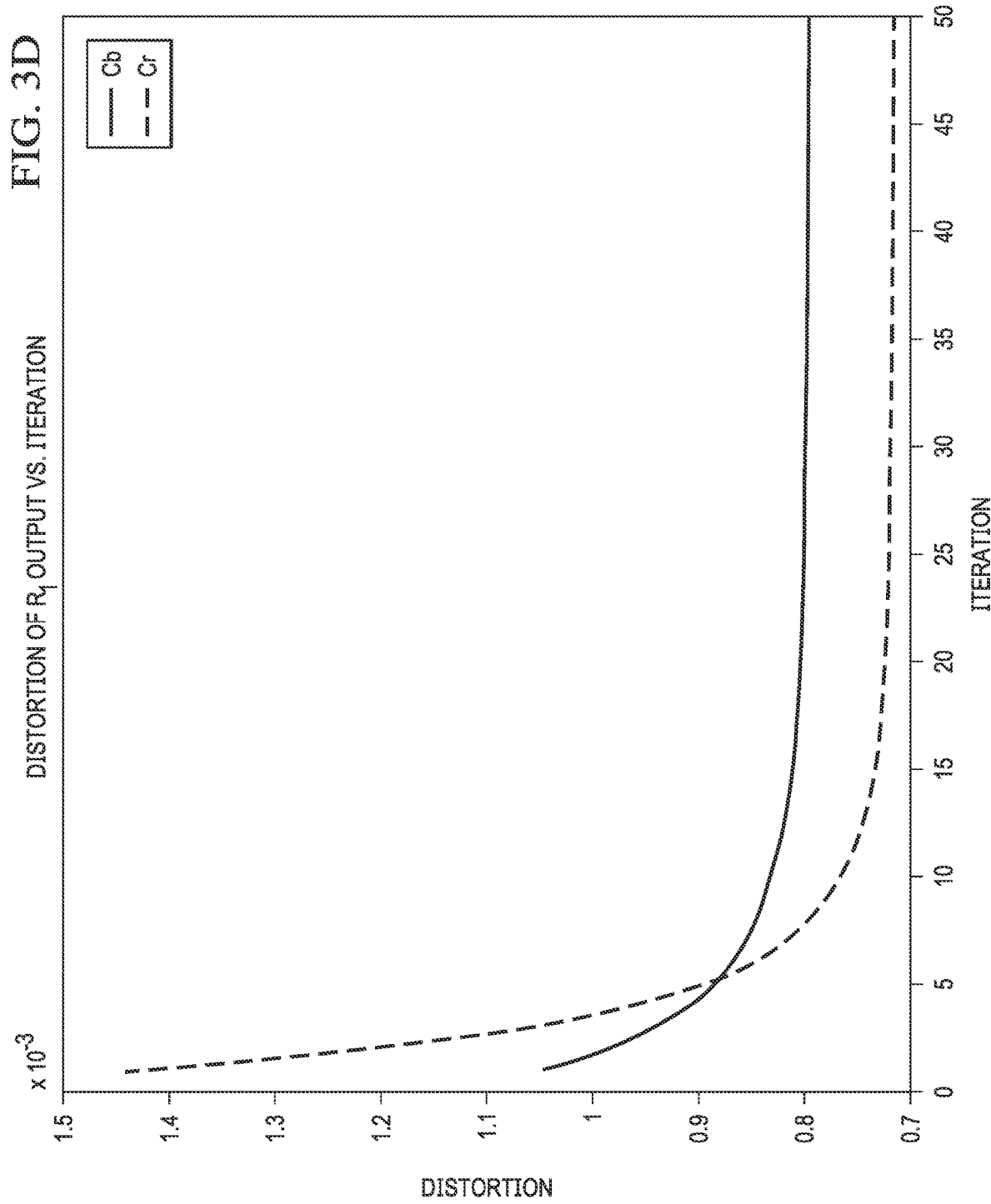

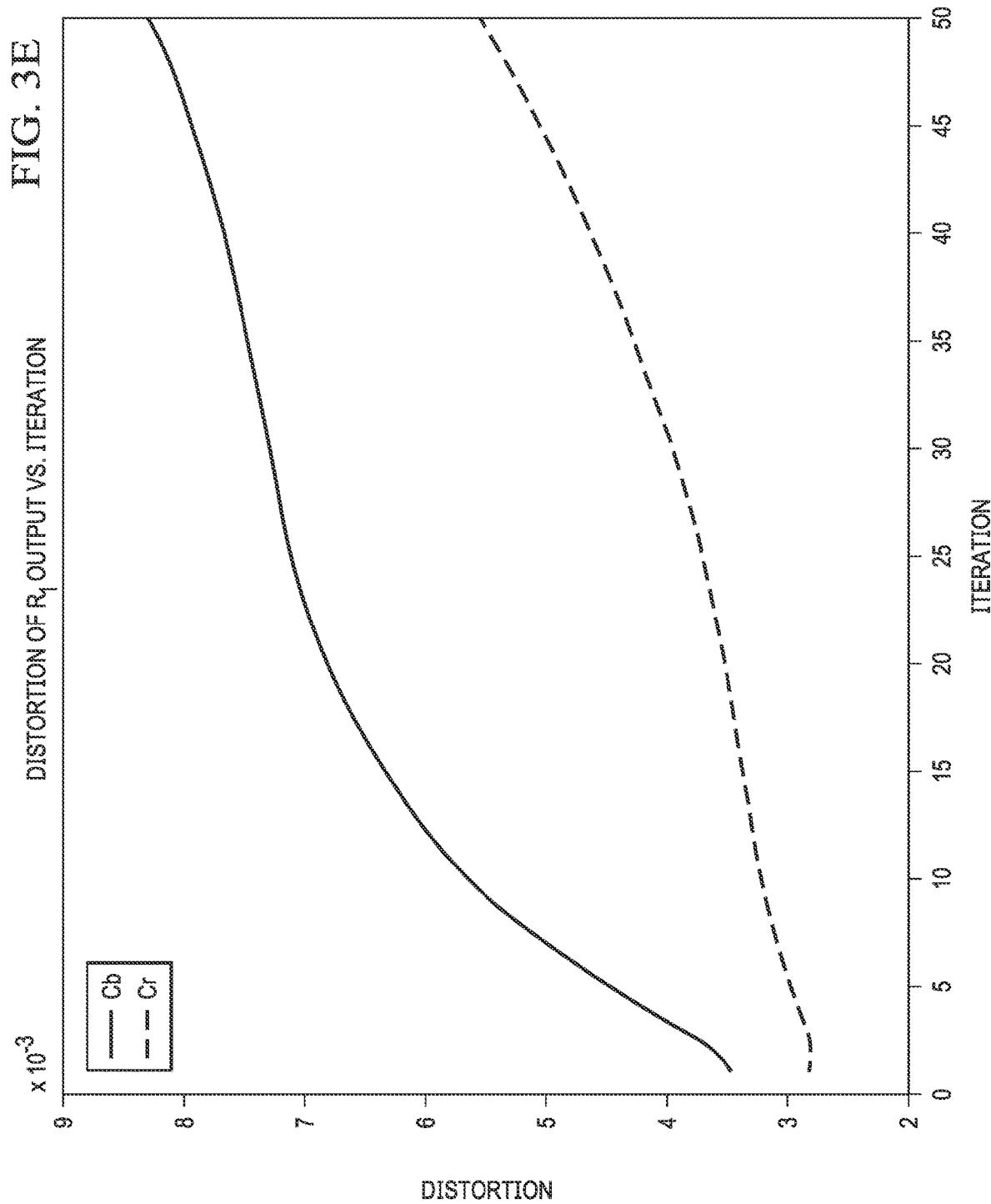

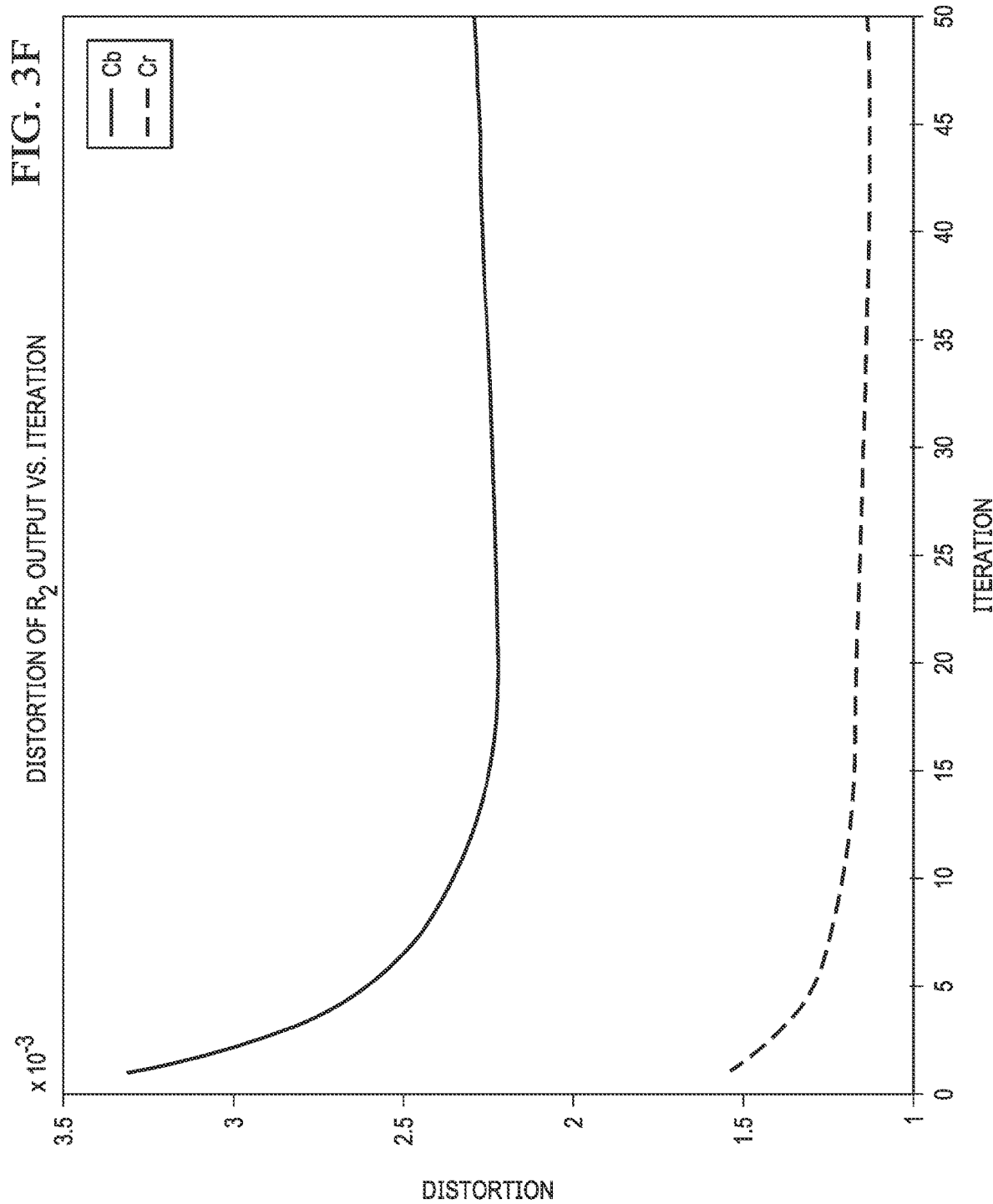

CHAINED RESHAPING FUNCTION OPTIMIZATION

CROSS REFERENCE TO RELATED APPLICATIONS

This application is a U.S. National Stage application under U.S.C. 371 of International Application No. PCT/US2022/031767, filed on Jun. 1, 2022 (references D21038WO01), which claims priority to European Patent Application No. 21178180.2, filed 8 Jun. 2021 and U.S. provisional application 63/208,190, filed 8 Jun. 2021, all of which are incorporated herein by reference in their entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components/channels (e.g., luma Y and chroma Cb and Cr) of a color space, where each color component/channel is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance, represented in a codeword among codewords representing an image, etc.) of an input video signal to output screen color values (e.g., screen luminance, represented in a display drive value among display drive values used to render the image, etc.) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system (HVS) responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 *"High Dynamic Range EOTF of Mastering Reference Displays"* (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). Example (e.g., HDR, Hybrid Log Gamma or HLG, etc.) EOTFs are defined in SMPTE 2084 and Rec. ITU-R BT.2100, "Image parameter values for high dynamic range television for use in production and international programme exchange," (06/2017). See also ITU Rec. ITU-R BT.2020-2, "Parameter values for ultra-high definition television systems for production and international programme exchange," (October 2015), which is incorporated herein by reference in its entirety and relates to Rec. 2020 or BT. 2020 color space. As appreciated by the inventors here, improved techniques for coding high quality video content data to be rendered with a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

WO 2018/005705 A1 discloses a method to reconstruct a high dynamic range video signal. A decoder receives parameters in the input bitstream to generate a prediction function. Using the prediction function, it generates a first set of nodes for a first prediction lookup table, wherein each node is characterized by an input node value and an output node value. Then, it modifies the output node values of one or more of the first set of nodes to generate a second set of nodes for a second prediction lookup table, and generates output prediction values using the second lookup table. Low-complexity methods to modify the output node value of a current node in the first set of nodes based on computing modified slopes between the current node and nodes surrounds the current node are presented.

WO 2017/015564 A1 discloses a method of encoding a digital video data that applies adaptive pre-processing to data representing high dynamic range (HDR) and/or wide color gamut (WCG) image data prior to encoding and complementary post-processing to the data after decoding in order to allow at least partial reproduction of the HDR and/or WCG data. The example methods apply one or more color space conversions, and a perceptual transfer functions to the data prior to quantization. The example methods apply inverse perceptual transfer functions and inverse color space conversions after decoding to recover the HDR and/or WCG data. The transfer functions are adaptive so that different transfer functions may be applied to video data sets including different groups of frames, frames or processing windows in a single frame. Information on the data set and information on the applied transfer function is passed as metadata from the encoder to the decoder.

WO 2012/125802 A1 discloses a method to transform image data for display on a target display. A sigmoidal transfer function provides a free parameter controlling min-tone contrast. The transfer function may be dynamically adjusted to accommodate changing ambient lighting conditions. The transformation may be selected so as to automatically adapt image data for display on a target display in a way that substantially preserves creative intent embodied in the image data. The image data may be video data.

Minoo, K. at al.: "Description of the reshaper parameters derivation process in ETM reference software", Joint Collaborative Team on Video Coding (JCT-VC) of ITU-T SG 16 WP 3 and ISO/IEC JTC 1/SC 29/WG 11, 23rd Meeting: San Diego, USA, 19-26 Feb. 2016, document JCTVC-W0031, date saved: 11 Jan. 2016, XP030117798, discloses a reshaping process for analyzing an input HDR signal in a HEVC processing pipeline, producing an SDR compatible reshaped video signal, and reshaping parameters for reconstructing the HDR signal from the reshaped video signal.

Francois, E. et al: "HDR CE2-related: some experiments on ETM with dual grading input", Joint Collaborative Team on Video Coding (JCT-VC) of ITU-T SG 16 WP 3 and ISO/IEC JTC 1/SC 29/WG 11, 23rd Meeting: San Diego, USA, 19-26 Feb. 2016, document JCTVC-W0089, date saved: 15 Feb. 2016, XP030117867, discloses a dual-grading HDR distribution scenario. Both SDR and HDR versions are given as input of the HDR distribution system to generate a SDR compatible version therefrom.

SUMMARY OF THE DISCLOSURE

The invention is defined by the independent claims. The dependent claims concern optional features of some embodiments of the invention.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3A through FIG. 3F illustrate example distortions in reshaped video signals;

DESCRIPTION OF EXAMPLE EMBODIMENTS

Figure 1:
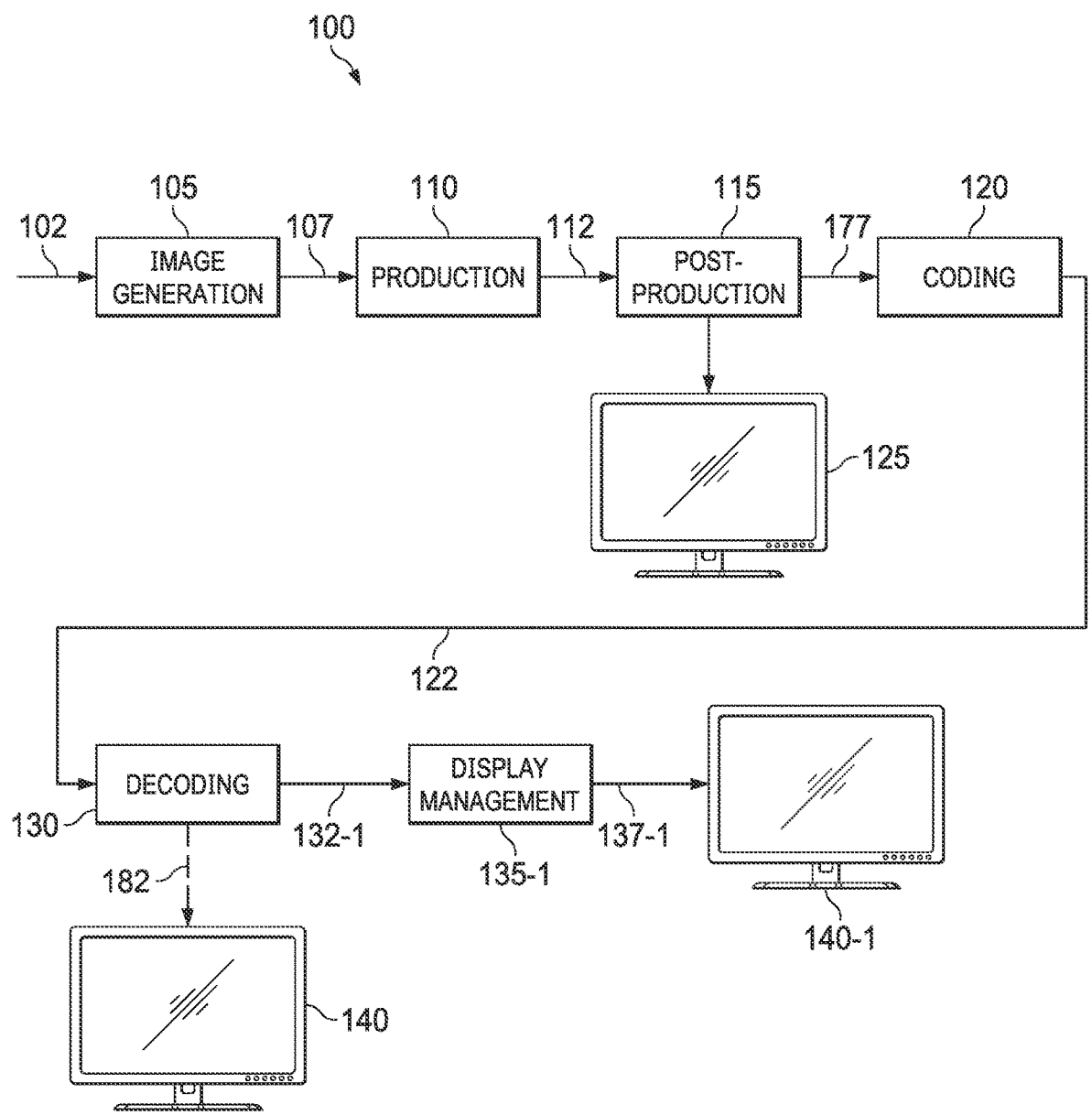
FIG. 1 illustrates an example image processing pipeline for performing chained reshaping optimization.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Techniques for chained reshaping optimization (CRO) is described herein. A chain of reshaping functions can be concatenated in a pipeline. Each reshaping function in the chain of reshaping functions has a reference color grade (or a reference video signal) to approximate and generate a target (or reshaped) color grade that is the same as or closely approximates the reference color grade. The chain of reshaping functions can be used to generate a plurality of target (or reshaped) color grades. As used herein, different color grades of the same video content may be of different combinations of some or all of dynamic ranges, color spaces or gamuts, spatial resolutions, image refresh rates, chroma sampling formats, image containers, etc. A specific color grade may refer to video data—such as carried in a video signal—with a specific combination of some or all of: dynamic range, color space or gamut, spatial resolution, image refresh rate, chroma sampling format, image container, etc.

A constrained or unconstrained optimization solution/algorithm can be implemented or performed to find optimized reshaping functions constituting the chain of reshaping functions. The optimization solution/algorithm can be implemented as an iterative solution/algorithm in a constrained or unconstrained problem formulation.

For the purpose of illustration only, color grades corresponding to—or generated by video codecs implementing—example (e.g., bitstream, video coding, Dolby, third-party proprietary, standards-based, etc.) profiles relating to HDR10 backward compatible video coding, SDR backward compatible video coding, HLG backward compatible video coding, and so forth, are used in some discussions herein as non-limiting implementation examples to illustrate some or all of these techniques. It should be noted that in various embodiments, these and other profiles can be used as input video signal, as any, some or all of reference video signals or color grades, as any, some or all of target or reshaped video signals or color grades, and so on.

Example (e.g., bitstream, video coding, Dolby, third-party proprietary, standards-based, etc.) profiles, which may be supported or implemented by video codecs as described herein, can be found in SMPTE ST 2094, "Dynamic Metadata for Color Volume Transform (DMCVT)," (2016), the entire contents of which are hereby incorporated by reference as if fully set forth herein. Profiles as described herein may include, but are not limited to only, any of: profiles supported by 10 bit codecs such as the 10-bit HEVC (Main 10) profile; profiles supported by 8 bit codecs such as the 8-bit AVC (Main) profile; profiles supported by video codes implementing perceptual quantization; profiles supported by video codecs implementing SDR video coding such as Profile 8.2 for Rec. 709 SDR video, Profile 32.2 for SDR Mobile video, and so on; profiles supported by video codes implementing Hybrid Log Gamma or HLG video coding such as mobile video and DVB broadcasting video, and so on; etc. These (e.g., bitstream, video coding, Dolby, third-party proprietary, standards-based, etc.) profiles may be used to support different user devices, different video codecs, different dynamic ranges, different color spaces, different domains in which codewords of images are represented, and so forth.

The chain reshaping function optimization techniques as described herein can be used to provide static mapping(s) as well as dynamic mapping(s) among different color grades. Static mapping(s) may be generated beforehand and selected (e.g., based at least in part on actual codeword distributions or other characteristics of an input image, etc.) for application at runtime, while dynamic mapping(s) may be generated and applied on the fly at runtime. By way of example but not limitation, some or all of these techniques can be implemented or applied to provide static mappings among or between different target (or reshaped) color grades supported by chained reshaping functions in the pipeline, for example by concatenating (e.g., ordered, chained, sequential, directed, etc.) reshaping functions in the chain of reshaping functions and by applying the concatenated reshaping functions to a (e.g., target, reshaped, etc.) color grade decoded from a video signal. For example, color grades corresponding to different profiles (e.g., Dolby Vision Profiles supported by Dolby Vision video coding solutions commercially available from Dolby Laboratories, Inc., California, etc.) may be converted via static mappings.

In a first example, a first (e.g., bitstream, video coding, Dolby, third-party proprietary, standards-based, etc.) profile (e.g., Dolby Vision Profile 8.4, etc.) supported by HLG backward compatible codecs may be converted via static mappings herein to a (e.g., bitstream, video coding, Dolby, third-party proprietary, standards-based, etc.) profile (e.g., Dolby Vision Profile 8.2/9.2/32.2, etc.) supported by SDR backward compatible codecs in widely deployed user devices. More specifically, given a (e.g., first profile, Dolby Vision Profile 8.4, etc.) video signal or an (input) image in the HLG (Hybrid Log Gamma) base layer of the video signal as input, a first reshaping function can be constructed or used to convert the HLG input image to an SDR image. A second different reshaping function can then be constructed or used to further convert the SDR image to a PQ image—for example, which may be the same as or equivalent to an output 1000 nit PQ image from directly reshaping the input image in the first profile or a BT. 2100 color space.

In a second example, a second (e.g., bitstream, video coding, Dolby, third-party proprietary, standards-based, etc.) profile (e.g., Dolby Vision Profile 8.1, etc.) supported by HDR10 backward compatible codecs may be converted via static mappings herein to a (e.g., bitstream, video coding, Dolby, third-party proprietary, standards-based, etc.) profile (e.g., Dolby Vision Profile 8.4, etc.) supported by HLG backward compatible codecs. More specifically, given a (e.g., second profile, Dolby Vision Profile 8.1, etc.) video signal or an (input) image in the 1000 nit PQ base layer of the video signal as input, a first reshaping function can be constructed or used to convert the input 1000 nit PQ image to a 1000 nit HLG (base layer) image. A second different reshaping function can then be constructed or used to further convert the 1000 nit HLG (base layer) image to a 4000 nit PQ image—for example, which may be the same as or equivalent to an output 4000 nit PQ image from directly reshaping the input image in the second profile.

It should be noted that in various embodiments these and other chains of reshaping functions—including but not limited to longer chains of reshaping functions—can be constructed optimized or used to generate pluralities of target (or reshaped) color grades.

In some operational scenarios, an iterative (optimization) algorithm can be used to support revertability in forward and backward (reshaping) paths. For example, an output color grade (or an output video signal) generated from backward reshaping can be optimized to be close to an input color grade (or an input video signal) of forward reshaping. Hence, the output video signal can be eventually return to the (original) input video signal (or an original input domain).

In some operational scenarios, an output color grade (or an output or reshaped video signal) generated from (e.g., at the end of, etc.) a chain of reshaping functions may not be in the same domain or may not be the same as or approximate to an input color grade (or an input video signal) input to the chain of reshaping functions. These techniques support adjusting the (e.g., final, optimized, iteratively optimized, etc.) output color grade. Additionally, optionally or alternatively, these techniques can be implemented to ensure a relatively high level of fidelity in each intermediate (target) color grade generated with some or all of the chain of reshaping functions by minimizing deviations or differences between the intermediate color grade (e.g., SDR color grade, etc.) and an (original) reference color grade (e.g., reference SDR color grade, etc.). Additionally, optionally or alternatively, some or all of these techniques can be implemented in a wide variety of video delivery and display applications including but not limited to those supporting single-layer backward compatible (SLBC) codec.

Example embodiments described herein relate to encoding video images in connection with chained reshaping optimization. An input image of an input video signal to a pipeline of chained reshaping functions is received, the pipeline of chained reshaping functions including a chain of reshaping functions. Two or more reference images are generated for two or more reference color grades from input image of the input video signal, each reference image in the two or more reference images corresponding to a respective reference color grade in the two or more reference color grades. The input image and the two or more reference images are used to determine two or more sets of operational parameters for two or more chained reshaping functions in the pipeline of chained reshaping functions, each set of operational parameters specifying a respective chained reshaping function in the two or more chained reshaping functions, each chained reshaping function in the two or more chained reshaping functions being used to generate a respective reshaped image in two or more reshaped images in two or more reshaped color grades. A selected reshaped image in a selected reshaping color grade, among the two or more reshaped images in the two or more reshaping color grades, is encoded in a video signal along with image metadata, the image metadata including one or more sets of operational parameters for one or more chained reshaping functions among the two or more chained reshaping functions, a recipient device of the video signal being caused to use the image metadata and the selected reshaped image to generate a reconstructed image of a reshaping color grade other than the selected reshaping color grade.

Example embodiments described herein relate to decoding video images in connection with chained reshaping optimization. A reshaped image in a reshaping color grade, along with image metadata, is decoded from a video signal, the image metadata including one or more sets of operational parameters that respectively specify one or more chained reshaping functions in a pipeline of chained reshaping functions. At least one of the one or more chained reshaping functions is applied to the reshaped image decoded from the video signal to generate a second reshaped image in a second reshaping color grade. A display image generated from the second reshaped image is rendered on a display device.

Example Image Processing Pipeline

FIG. 1 depicts an example process of a video delivery pipeline (100) showing various stages from video capture to video content display. A sequence of video frames (102) is captured or generated using image generation block (105). Video frames (102) may be digitally captured (e.g., by a digital camera, etc.) or generated by a computer (e.g., using computer animation, etc.) to provide video data (107). Additionally, optionally or alternatively, video frames (102) may be captured on film by a film camera. The film can be converted to a digital format to provide the video data (107). In a production phase (110), the video data (107) is edited to provide a video production stream (112).

The video data of the production stream (112) is then provided to a processor for post-production editing (115). The post-production editing (115) may include (e.g., automatically, manually, automatically in part manually in part, etc.) adjusting or modifying colors or brightness in particular areas of an image to enhance the image quality or achieve a particular appearance for the image in accordance with the video creator's creative intent. This is sometimes called "color timing" or "color grading." Other editing (e.g., scene selection and sequencing, manual and/or automatic scene cut information generation, image cropping, addition of computer-generated visual special effects, etc.) may be performed at the post-production editing (115) to yield, through content mapping and/or color grading, an original input video signal to a pipeline of chained reshaping functions or the like.

The original input video signal may be used by an upstreaming device (e.g., encoder, transcoder, production studio system, content aggregation and/or distribution server, streaming server, etc.)—or the post-production block (115) and/or the coding block (120) therein—to generate one, two or more reference color grades of images as well as chained reshaping functions used to generate one, two or more reshaped color grades that respectively the same as or closely approximate (e.g., through minimization of prediction errors, through closed-form solutions to unconstrained or constrained optimization problems, etc.) the one, two or more reference color grades.

The reference color grades and/or the reshaped color grades may comprise different sets or sequences of corresponding reference images depicting the same scenes or semantic contents, but may differ in one or more of: different dynamic range levels, different color spaces, different EOTFs, different color space types, etc. For example, these reference color grades and/or reshaped color grades may comprise images with user perceptible visual qualities optimized for different video codecs and/or different image processing capabilities and/or different user devices such as iOS devices, Android devices, tablet computers, laptop computers, desktop computers, televisions of different display capabilities, etc. In some operational scenarios, a reshaped color grade that closely approximates a reference color grade may be more efficiently (e.g., with less computational costs, with less time, etc.) transmitted, decoded or reconstructed by a recipient device of a video signal that includes some or all operational parameters of some or all chained reshaping functions and a color grade encoded in the video signal. Example reshaping operations are described in U.S. Pat. No. 10,080,026, "Signal reshaping approximation," by G-M. Su et al., the entire content of which is hereby incorporated by reference as if fully set forth herein.

In some operational scenarios, the coding block (120) receives the original input video signal (e.g., an input color grade, an HLG Rec. 2020 video signal, etc.) generated from the post-production block (115). Content mapping and/or color grading/timing tools may be used to generate the one, two or more reference color grades from the original input video signal. Each of the input video signal and reference color grades depicts the same set of visual scenes or semantic contents. The reference color grades may be derived from the original input video signal through content mapping and/or color grading performed manually, automatically or a combination of manual and automatic image processing operations.

For the purpose of illustration only, the original input video signal—e.g., received by the coding block (120) from the post-production block (115)—represents an input color grade of HDR images 117. Reference images in a reference color grade to be approximated by a reshaped color grade may be content mapped (e.g., using an appropriate profile of a video encoding tool such as Dolby Vision coding tools commercially available from Dolby Laboratories, Inc., San Francisco, California, etc.) from the HDR images (117) in the original input video signal. In some embodiments, during post-production editing (115), the HDR images (117) are viewed on an HDR reference display (125) that supports the high dynamic range by a colorist who is performing post-production editing operations on the HDR images (117).

The coding block (120) may implement some or all chained optimization operations as described herein to generate multiple sets of operational parameters for chained reshaping functions in the pipeline used to map images in the input video signal to reshaped images in intermediate and/or final reshaped color grades. In some operational scenarios, a (e.g., single, etc.) selected reshaped color grade (e.g., an SDR color grade, an SDR color grade for mobile devices, an SDR color grade for SDR televisions, etc.) selected from the intermediate and final reshaped color grades can be compressed/encoded by the coding block (120) into a coded bitstream (122). Some or all of the multiple sets of operational parameters for the chained reshaping functions (e.g., backward reshaping functions, inverse reshaping functions, etc.) may be included or encoded in the same coded bitstream as a part of image metadata.

The coding block (120) may include audio and video encoders, such as those defined by ATSC, DVB, DVD, Blu-Ray, and other delivery formats, to generate the coded bitstream (122).

In some operational scenarios, the coded bitstream (122) may represent a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer. Example single layer video coding operations are described in U.S. Patent Application Publication No. 2019/0110054, "Encoding and decoding reversible production-quality single-layer video signals," by G-M. Su et al., the entire contents of which are hereby incorporated by reference as if fully set forth herein.

The multiple sets of operational parameters for the chained reshaping functions may be decoded and used in prediction operations by a recipient device of the video signal or coded bitstream to generate reconstructed images of other color grade(s) from the decoded images of one color grade. One or more different video quality levels may be generated for the reconstructed images using prediction operations (e.g., backward reshaping operations, inverse tone mapping operations, etc.) with the multiple sets of operational parameters for the chained reshaping functions as generated by the (upstream) coding block (120). These different video quality levels may respectively correspond to one or more different color grades, such as intermediate and/or final reshaped color grades on the encoder side.

In some operational scenarios, the decoded images represent SDR images that were forward reshaped by an upstream video encoder (e.g., with the coding block (120), etc.) from the color graded HDR images (117) to approximate a reference SDR color grade. The reconstructed images—as generated from the decoded images using reshaping functions specified with the multiple sets of operational parameters in the image metadata transmitted in the coded bitstream (122)—represent images approximating other intermediate and/or final reference color grades other than the reference SDR color grade.

Additionally, optionally, or alternatively, the coded bitstream (122) is encoded with additional image metadata including but not limited to display management (DM) metadata that can be used by the downstream decoders to perform display management operations on decoded images or backward reshaped images to generate display images optimized for rendering on target displays, which may or may not have the same display capabilities as reference displays for which the intermediate and/or final reference color grades provide relatively high visual qualities.

The coded bitstream (122) is then delivered downstream to receivers such as mobile devices, handsets, tablet computers, decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as images (e.g., forward reshaped SDR images, etc.) encoded by the coding block (120) into the bitstream (122), subject to quantization errors generated in compression performed by the coding block (120) and decompression performed by the decoding block (130).

In operational scenarios in which the receiver operates with (or is attached or operatively linked to) a target display 140 that supports rendering the decoded images (182), the decoding block (130) can decode the images (182) from (e.g., the single layer in, etc.) the coded bitstream (122), and use the decoded images (182) (e.g., forward reshaped SDR images, etc.) directly or indirectly for rendering on the target display (140).

In some operational scenarios, the target display (140) is of similar characteristics as the SDR reference display (125), and the decoded images (182) are forward reshaped SDR images directly watchable on the target display (140).

In some embodiments, the receiver operates with (or is attached or operatively linked to) a target display that has different display capabilities from those of a reference display for which the decoded images (182) were optimized. Some or all of the multiple sets of operational parameters for the chained reshaping functions in the image metadata (or composer metadata) may be used to compose or reconstruct images from the decoded images (182) that are optimized for the target display.

For example, the receiver may operate with an HDR target display 140-1 that supports a high dynamic range (e.g., 100 nits, 200 nits, 300 nits, 500 nits, 1,000 nits, 4,000 nits, 10,000 nits or more, etc.) than that of the decoded images (182). The receiver can extract the image metadata from (e.g., metadata container(s) in, etc.) the coded bitstream (122), and use the multiple sets of operational parameters for the chained reshaping functions in the image metadata (or composer metadata) to compose or reconstruct images 132-1 from the decoded images (182) such as forward reshaped SDR images.

In some operational scenarios, the reconstructed images (132-1) represent reconstructed (e.g., HDR, EDR, images optimized for 1000-nit display devices, images optimized for 4000-nit display devices, etc.) images optimized for viewing on a display that is the same as, or comparable with, a target display operating in conjunction with the receiver. The receiver may directly use the reconstructed images (132-1) for rendering on the target display.

In some operational scenarios, the reconstructed images (132-1) represent reconstructed images optimized for viewing on a (e.g., reference, etc.) display that is not the same as a target display (140-1) operating in conjunction with the receiver. A display management block (e.g., 135-1, etc.)—which may be in the receiver, in the target display (140-1), or in a separate device—further adjusts the reconstructed images (132-1) to characteristics of the target display (140-1) by generating a display-mapped signal (137-1) adapted to the characteristics of the target display (140-1). Display images or the adjusted reconstructed images may be rendered on the target display (140-1).

Pipelines of Chained Reshaping Functions

Figure 2A:
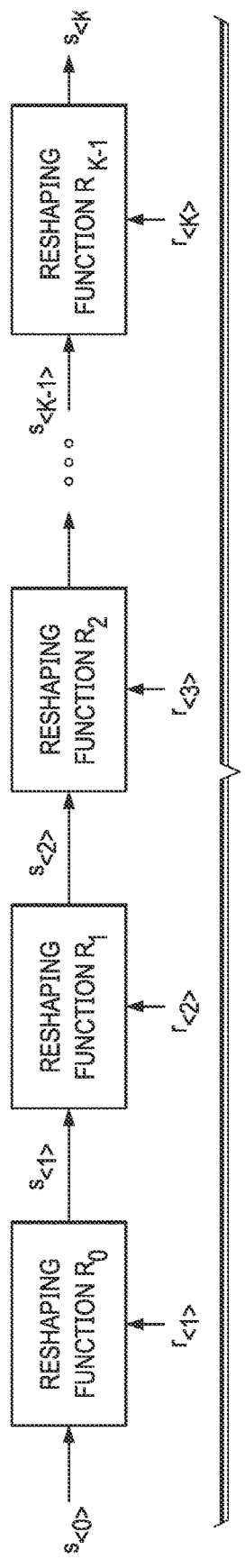
FIG. 2A through FIG. 2D illustrate example pipelines of chained reshaping functions.

FIG. 2A illustrates an example pipeline of chained reshaping functions. These chained reshaping functions can be generated or constructed using optimization methods or procedures as described herein.

Denote an (original) input video signal (or an input image therein) to the pipeline of chained reshaping functions as $s_{<0>}$. The i-th pixel, denoted as $s_{<0>,i}$, of the input signal (or the input image therein) comprises three channels, respectively denoted as $(s_{<0>,i}^y, s_{<0>,i}^{c0}, s_{<0>,i}^{c1})$, of an input color space (or an input domain).

The pipeline of chained reshaping functions comprise K reshaping functions concatenated together, where K is an integer greater than one (1). The k-th reshaping function, denoted as $R_k(\ )$, in the pipeline of chained reshaping functions can have, or can be assigned with, a corresponding reference video signal (or a corresponding reference image therein) denoted as $r_{<k+1>}$, where k=0, . . . , K−1.

Denote the i-th pixel of the reference signal (or the reference image therein) $r_{<k+1>}$ for the k-th reshaping function $R_k(\ )$ as $(r_{<k+1>,i}^y, r_{<k+1>,i}^{c0}, r_{<k+1>,i}^{c1})$. Denote the input video signal (or an input image therein) to the k-th reshaping function $R_k(\ )$ and the output or reshaped video signal (or an output or reshaped image therein) from the k-th reshaping function $R_k(\ )$ as $s_{<k>}$ and $s_{<k+1>}$, respectively, where k=0, . . . , K−1. The k-th reshaping function $R_k(\ )$ can be applied to forward reshape the input signal (or the input image therein) $s_{<k>}$ into the output signal (or the output image therein) $s_{<k+1>}$, as follows:

$$s_{\langle k+1 \rangle} = R_k(s_{\langle k \rangle}) \quad (1)$$

In many operational scenarios, the final output or reshaped video signal (or a final output image therein) from the pipeline of chained reshaping functions is not equal to the first or original input video signal (or the first or original input image therein), as follows:

$$r_{\langle K \rangle} \neq s_{\langle 0 \rangle} \quad (2)$$

For the k-th reshaping function, its output signal, $s_{<k+1>}$, should be as close as possible (e.g., subject to a minimization/optimization procedure, depending on an error threshold/measure, etc.) to the reference signal, $r_{<k+1>}$, as follows:

$$\min_{R_k()} \|s_{\langle k+1 \rangle} - r_{\langle k+1 \rangle}\|^2 \quad (3)$$

As a result, construction/generation of optimized reshaping functions in the entire pipeline of chained reshaping functions can be formulated as (solutions to) a linear combination of individual optimization problems of individual reshaping functions, as follows:

$$\min_{\{R_k()\}} \sum_{k=0}^{K-1} u_k \|s_{\langle k+1 \rangle} - r_{\langle k+1 \rangle}\|^2 \quad (4)$$

where $u_k$ represents a weighting factor assigned to each corresponding reshaping function in the pipeline of chained reshaping functions.

While an end-to-end optimization may be relatively difficult or computationally intensive to solve, better, more efficient ways such as sequential optimization can be used to tackle this issue.

Figure 2B:
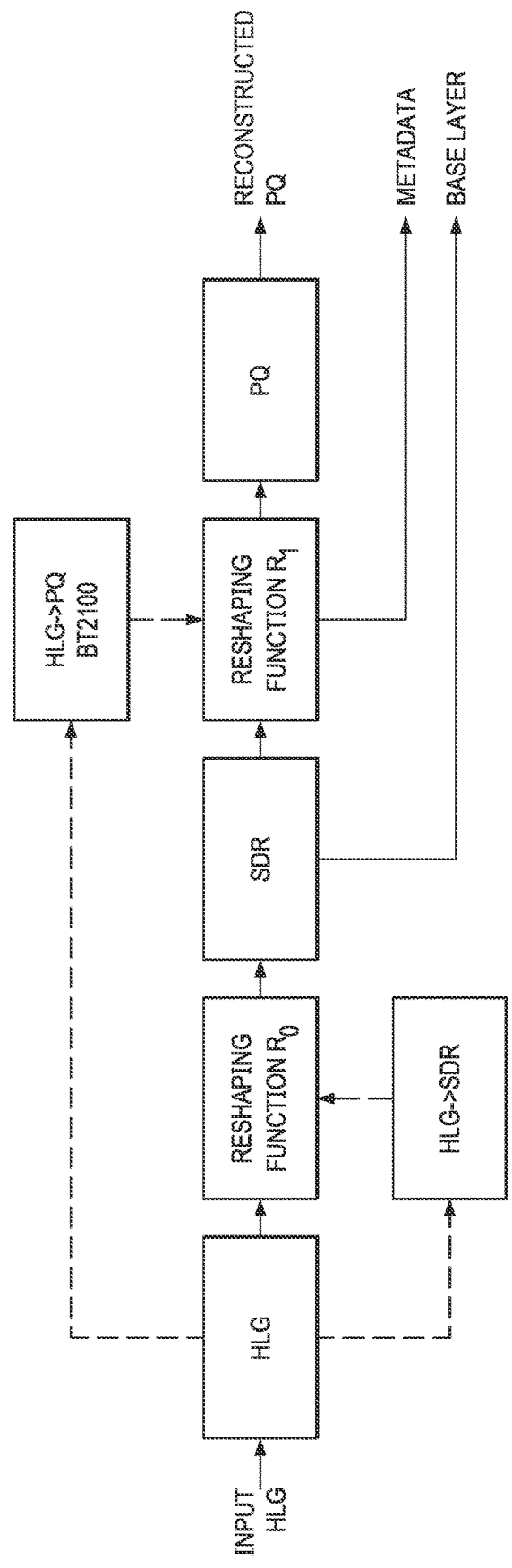

FIG. 2B illustrates an example (specific) pipeline of chained reshaping functions, which may be used to implement conversion from Dolby Vision Profile 8.4 to Dolby Vision Profile 8.2 as previously mentioned.

As shown in FIG. 2B, the first or original video signal $s_{<0>}$ to the pipeline of chained reshaping functions is an input HLG (e.g., R.2020, etc.) signal. The first reshaping function $R_0$ in the pipeline of chained reshaping functions has, or is assigned with, the reference signal $r_{<1>}$, which can be derived or converted from the input HLG signal using HLG-to-SDR API (Application Programming Interface) or toolkit commercially available.

The output or reshaped video signal $s_{<1>}$ can be generated from applying the first reshaping function $R_0$ in the pipeline of chained reshaping functions to the first or original input video signal $s_{<0>}$—or in other words, reshaping the first or original input video signal $s_{<0>}$ based on the first reshaping function $R_0$. As illustrated in FIG. 2B, the output or reshaped video signal $s_{<1>}$ may be a reshaped SDR signal, which may be the same as or closely approximates the reference signal $r_{<1>}$.

The reshaped SDR signal ($s_{<1>}$) can be used as the input video signal to the second reshaping function $R_1$. The second reference signal $r_{<2>}$ may be a reference PQ signal. The reference PQ signal can be derived or converted from the first or original input video signal (or the input HLG video signal) using a video codec such as HLG backward compatible codec or using other video codecs implementing relevant video coding standards or profiles defined therein such as BT. 2100 standard.

The output or reshaped video signal ($s_{<2>}$) is generated from applying the second reshaping function $R_1$ in the pipeline of chained reshaping functions to the reshaped video signal $s_{<1>}$—or in other words, reshaping the reshaped video signal $s_{<1>}$ based on the first reshaping function $R_1$. The output or reshaped video signal ($s_{<2>}$) may be a PQ signal, which may be the same as or closely approximates the second reference signal $r_{<2>}$ or the reference PQ signal.

As shown, the reshaped SDR video signal outputted from the first reshaping function $R_0$ may be encoded/represented as base layer image data in a video signal. Reshaping function parameters such as those specifying the second reshaping function R/can be included as a part of image metadata included in the video signal and used by a recipient device of the video signal to reconstruct or reshape the SDR video signal represented in the base layer image data of the video signal into the reconstructed or reshaped PQ video signal with reconstructed PQ image(s).

Sequential/Chained Optimization

A variety of predictors can be used to construct or generate chained reshaping functions as described here, for example, using sequential optimization processes. These predictors may be advanced predictors such as Tensor Product B-Spline (TPB) predictors as well as non-TPB predictors.

In some operational scenarios, an optimization problem for constructing reshaping functions in the entire pipeline of chained reshaping functions can be broken down to two optimization problems: one for constructing reshaping functions/mappings (which may be referred to as luma reshaping functions) used for luma channel and the other for constructing reshaping functions/mappings (which may be referred to as chroma reshaping functions) for chroma channels. For example, a reshaping function in the pipeline of reshaping functions may comprise a luma reshaping function/mapping (for reshaping input codewords—or input luma codewords—in a luma channel into output codewords—or output luma codewords—in a luma channel) as well as chroma reshaping functions/mappings (for reshaping input codewords—or input luma and chroma codewords—in luma and chroma channel into output codewords—or output chroma codewords—in chroma channels).

In some operational scenarios, a chroma and/or luma reshaping function/mapping (e.g., a multi-piece polynomial, a one-dimensional lookup table or 1D LUT, a part of a three-dimensional lookup table or 3D LUT, etc.) can be constructed or generated using CDF matching techniques in solving the optimization problem for the luma channel. Additionally, optionally or alternatively, chroma and/or luma reshaping functions/mappings can be constructed or generated with a cross-color channel predictor such as multiple color channel multiple regression (MMR) prediction based techniques. Additionally, optionally or alternatively, chroma and/or luma reshaping functions or mappings can be constructed or generated with a cross-color channel predictor such as tensor product B-spline (TPB) prediction based techniques using B-Spline functions as basis functions.

Example cumulative density function (CDF) matching operations are described in PCT Application No. PCT/US2017/50980, filed on Sep. 11, 2017; U.S. Provisional Application Ser. No. 62/404,307, filed on Oct. 5, 2016, (also published in Apr. 5, 2018, as U.S. Patent Application Publication Ser. No. 2018/0098094), the entire contents of which are hereby incorporated by reference as if fully set forth herein. Example MMR based operations are described in U.S. Pat. No. 8,811,490, which are incorporated by reference in its entirety as if fully set forth herein. Example TPB based operations are described in U.S. Provisional Application Ser. No. 62/908,770, titled "TENSOR-PRODUCT B-SPLINE PREDICTOR," filed on Oct. 1, 2019, which are incorporated by reference in its entirety as if fully set forth herein.

In a first example, MMR based chroma mapping functions/mappings (or MMR predictors) for the k-th reshaping function in the pipeline of chained reshaping functions can be constructed or generated as follows.

Denote an MMR expanded form for the i-th pixel of the input video signal (or an input image therein) as follows:

$$\overline{s}_{(k),i} = \begin{bmatrix} 1 & s^y_{(k),i} & s^{c0}_{(k),i} & s^{c1}_{(k),i} & \cdots & s^y_{(k),i} s^{c0}_{(k),i} & \cdots & (s^y_{(k),i} s^{c0}_{(k),i})^2 & \cdots & (s^{c0}_{(k),i})^2 (s^{c1}_{(k),i})^2 & \cdots \end{bmatrix} \quad (5)$$

MMR expanded forms for all P pixels can be collected into an input vector as follows:

$$S_{(k)} = \begin{bmatrix} \overline{s}_{(k),0} \\ \overline{s}_{(k),1} \\ \vdots \\ \overline{s}_{(k),P-1} \end{bmatrix} \quad (6)$$

An observation (or reference/target) chroma signal or vector—where ch can be EITHER a c0 or Cb channel OR a c1 or Cr channel—can be formed based on chroma codewords of the reference/target video signal (or a reference/target image therein), as follows:

$$r^{ch}_{(k+1)} = \begin{bmatrix} r^{ch}_{(k+1),0} \\ r^{ch}_{(k+1),1} \\ \vdots \\ r^{ch}_{(k+1),P-1} \end{bmatrix} \quad (7)$$

MMR coefficients, denoted as $m_{<k>}^{ch}$, can be used to predict output or reshaped chroma codewords in the output or reshaped video signal (or an output or reshaped image therein), using a matrix form as follows:

$$s^{ch}_{(k+1)} = s_{(k)} m^{ch}_{(k)} \quad (8)$$

The MMR coefficients $m_{<k>}^{ch}$, can be optimized by solving an optimization problem formulated as follows:

$$m^{ch,opt}_{(k)} = \mathrm{argmin}\|r^{ch}_{(k+1)} - s^{ch}_{(k+1)}\| = \mathrm{argmin}\|r^{ch}_{(k+1)} - s_{(k)} m^{ch}_{(k)}\| \quad (9)$$

For example, the optimized MMR coefficients may be found or generated via the least squared solution to the optimization problem in expression (9), as follows:

$$m^{ch,opt}_{(k)} = ((S_{(k)})^T (S_{(k)}))^{-1} ((S_{(k)})^T r^{ch}_{(k+1)}) \quad (10)$$

In some operational scenarios, each reshaping function—e.g., luma and chroma reshaping functions/mappings thereof—in the pipeline of chained reshaping functions can be generated or constructed sequentially starting from k=0 to K−1. For example, chroma reshaping functions/mappings in each reshaping function in the pipeline of chained reshaping functions can be generated or constructed sequentially starting from k=0 to K−1, using an example optimization procedure as illustrated in TABLE 1 below.

TABLE 1

Input signal: $s_{<0>}$
Reference signal: $r_{<k+1>}$, where k=0, ..., K−1
for k=0 to K−1
  // prepare input signal and reference output signal from
  reshaping function k
  { $s_{<k>}^{(t)}$, $r_{<k+1>}$ }
  // solve optimal reshaping coefficients
  Construct $S_{<k>}$ and $r_{<k+1>}^{ch}$
  $m_{<k>}^{ch,opt} = ((S_{<k>})^T (S_{<k>}))^{-1} ((S_{<k>})^T r_{<k+1>}^{ch})$
  // construct the predicted signal from reshaping function
  $s_{<k+1>}^{ch} = S_{<k>} m_{<k>}^{ch,opt}$
End In a second example, TPB based chroma mapping functions/mappings (or TPB predictors) for the k-th reshaping function in the pipeline of chained reshaping functions can be constructed or generated as follows.

For a ch color channel, the following matrices can be constructed:

$$S^{ch}_{(k)} = \begin{bmatrix} B^{ch}_0(s^y_{(k),0}, s^{c0}_{(k),0}, s^{c1}_{(k),0}) & \cdots & B^{ch}_{D^{ch}-1}(s^y_{(k),0}, s^{c0}_{(k),0}, s^{c1}_{(k),0}) \\ B^{ch}_0(s^y_{(k),1}, s^{c0}_{(k),1}, s^{c1}_{(k),1}) & \cdots & B^{ch}_{D^{ch}-1}(s^y_{(k),1}, s^{c0}_{(k),1}, s^{c1}_{(k),1}) \\ \vdots & \vdots & \vdots \\ B^{ch}_0(s^y_{(k),P-1}, s^{c0}_{(k),P-1}, s^{c1}_{(k),P-1}) & \cdots & B^{ch}_{D^{ch}-1}(s^y_{(k),P-1}, s^{c0}_{(k),P-1}, s^{c1}_{(k),P-1}) \end{bmatrix} \quad (11-1)$$

$$r^{ch}_{(k+1)} = \begin{bmatrix} r^{ch}_{(k+1),0} \\ r^{ch}_{(k+1),1} \\ \vdots \\ r^{ch}_{(k+1),P-1} \end{bmatrix} \quad (11-2)$$

where $B_0^{ch}(,), \ldots, B_{D^{ch}-1}^{ch}(,)$ are the TPB basis functions for the ch channel; $D^{ch}$ represents a total number of TPB basis functions.

Optimized TPB operational parameters, denoted as $m^{<k>}_{ch,opt}$, for the TPB based chroma reshaping functions/mappings can be constructed, generated or obtained by the least squared solution to a (global) TPB optimization problem—e.g., formulated using a formulation similar to expression (8) above—as follows:

$$m_{\langle k \rangle}^{ch,opt} = \left( \left( S_{\langle k \rangle}^{ch} \right)^T S_{\langle k \rangle}^{ch} \right)^{-1} \left( \left( S_{\langle k \rangle}^{ch} \right)^T r_{\langle k+1 \rangle}^{ch} \right) \qquad (12)$$

Optimization of Chained Reshaping Functions

A variety of optimization algorithms/methods can be used to improve the performance (e.g., improving accuracy in reconstructed video signal(s), minimizing prediction errors, supporting a wide variety of video codecs, etc.) of reshaping functions in a pipeline of chained reshaping functions. In various operational scenarios, these optimization algorithms/methods may or may not use constraints.

In some operational scenarios, an iterative algorithm/method—which may be referred to as non-constrained BESA (Backward Error Subtraction for signal Adjustment) algorithm/method—can be used to improve the performance of reshaping functions in a pipeline of chained reshaping functions. Example BESA algorithm/method can be found in U.S. Provisional Patent Application Ser. No. 63/013,063, "Reshaping functions for HDR imaging with continuity and reversibility constraints," by G-M. Su, filed on Apr. 21, 2020, and U.S. Provisional Patent Application Ser. No. 63/013,807 "Iterative optimization of reshaping functions in single-layer HDR image codec," by G-M. Su and H. Kadu, filed on Apr. 22, 2020, the contents of which are entirely incorporated herein by reference as if fully set forth herein.

The iterative algorithm/method can be run in T iterations, where T represents a (e.g., preconfigured, configured, dynamically determined, budgeted, etc.) integer greater than one (1). In each iteration (e.g., iteration t, where t=0, . . . , T−1) of T iterations, optimization can be first performed forwardly to obtain or generate reshaping function coefficients that define or specify reshaping functions in the pipeline of chained reshaping functions; reference signal modification can then be performed backwardly. A goal of the iterative algorithm/method is to modify reference signals, $r_{\langle k \rangle}^{(t)}$, in each iteration t, so that the end-to-end error (e.g., differences between a predicted final reshaped video signal and a final reference video signal, etc.) can be minimized.

In a non-limiting implementation example, the iterative algorithm/method can be implemented or performed in two for loops. In the outer for loop of the two for loops, the number of iterations (t) is increased or incremented by one until T iterations are reached as follows: t=0, . . . , T−1. In the inner for loop of the two for loops, forward optimization can be performed starting from the first reshaping function, $R_0$, to the last reshaping function, $R_{K-1}$.

At the end of each iteration of the inner for loop of the two for loops, backward reference signal modification can be performed from the second last reference signal, $r_{\langle K-1 \rangle}^{(t)}$, to the first reference signal $r_{\langle 1 \rangle}^{(t)}$. In some operational scenarios, the last reference signal, $r_{\langle k \rangle}^{(t)}$ is fixed, not subject to the mentioned backward reference signal modification. This is to maintain fidelity of the output (or the last reference signal) from the pipeline of chained reshaping functions and to avoid oscillation caused by changing final errors or final cost function (values) at each iteration (thus resulting in no or relatively slow convergence).

More specifically, at (e.g., each, etc.) iteration t, in the forward optimization, each reshaping function (e.g., the k-th reshaping function, etc.) can be generated or constructed by performing optimization to obtain optimized reshaping function coefficients $\{m_{\langle k \rangle}^{(t),ch,opt}\}$ and the predicted signal $s_{\langle k+1 \rangle}^{(t)}$ based on (1) $s_{\langle k \rangle}^{(t)}$, which is the first or original input video signal (or a first or original input image therein) if k=0 or an updated input video signal (or an updated input image therein) outputted from the (immediately) preceding reshaping function (e.g., the (k−1)-th reshaping function, etc.) if k≠0, and (2) $r_{\langle k+ \rangle}^{(t)}$, which is the updated reference video signal (or an updated reference image therein) from backward reference signal modification performed at the end of the (immediately) preceding iteration. These operations can be sequentially performed for all reshaping functions in the pipeline of chained reshaping functions from k=0 to K−1.

At the end of each iteration (t), the backward reference signal modification can be performed for each k by computing a prediction error for each color channel as follows:

$$e_{\langle k+1 \rangle}^{(t),ch} = r_{\langle k+1 \rangle}^{(k),ch} - s_{\langle k+1 \rangle}^{(t),ch} \qquad (13\text{-}1)$$

and then using the prediction error to modify the corresponding reference video signal (or a reference image therein) as follows:

$$r_{\langle k \rangle}^{(t+1),ch} = r_{\langle k \rangle}^{(t),ch} + f\left( e_{\langle k+1 \rangle}^{(t),ch} \right) \qquad (13\text{-}2)$$

These operations can be sequentially performed for all reference video signals (except the last reference video signal) from k=K−1 to 1.

In some operational scenarios, a function $f(\ )$ can be used to determine how to modify a reference video signal (or a reference image therein). The function may be used to propagate back relatively large errors to the reference video signal. For each pixel (or the i-th pixel), the function $f(\ )$ can be specified or defined as follows:

$$f\left( e_{\langle k+1 \rangle,i}^{(t),ch} \right) = \min\{ (|e_{\langle k+1 \rangle,i}^{(t),ch}| > \varepsilon) ? \alpha^{ch} \cdot e_{\langle k+1 \rangle,i}^{(t),ch} : 0, \lambda \} \qquad (14)$$

where ε is a minimum error threshold to determine whether an error is sufficiently large to warrant changing the reference video signal or (or the reference image therein); $\alpha^{ch}$ represents a convergence speed factor (or a scaling factor); λ represents the upper limit for modification.

In some operational scenarios, an adaptive scaling factor may be used in the function $f(\ )$, where the scaling factor is reduced as the iteration index t increases, as follows:

$$f\left( e_{\langle k+1 \rangle,i}^{(t),ch} \right) = \min\{ (|e_{\langle k+1 \rangle,i}^{(t),ch}| > \varepsilon) ? \beta^{t-1} \cdot \alpha^{ch} \cdot e_{\langle k+1 \rangle,i}^{(t),ch} : 0, \lambda \} \qquad (15)$$

where β is a discount factor such as 0.99, 0.98, or another numeric value.

An example iterative optimization procedure is illustrated in TABLE 2 below.

TABLE 2

Input signal: $s_{\langle 0 \rangle}^{(0)}$
Initialize reference signal: $r_{\langle k+1 \rangle}^{(0)} = r_{\langle k+1 \rangle}$ where k=0, ..., K−1
for t = 0 to T−1
  // forward
  for k=0 to K−1

TABLE 2-continued

```
// prepare input signal and reference output signal from
reshaping function k
  { s<k>(t), r<k+1>(t) }
// solve optimal reshaping coefficients
  Construct S<k>(t) and r<k+1>ch
    m<k>(t),ch,opt = ((S<k+1>(t))T(S<k>))−1((S<k>(t))Tr<k+1>ch)
  // construct the predicted signal from reshaping function
    s<k+1>(t),ch = S<k>(t)m<k>(t),ch,opt
end
// backward
for k=K−1 to 1
  // compute the output error
    e<k+1>(t),ch = r<k+1>(k),ch − s<k+1>(t),ch
  // modify the reference signal for previous function
    r<k>(k+1),ch = r<k>(k),ch + f(e<k+1>(t),ch)
end
end
```

Selecting an Optimized Number of Iterations

Figure 3B:
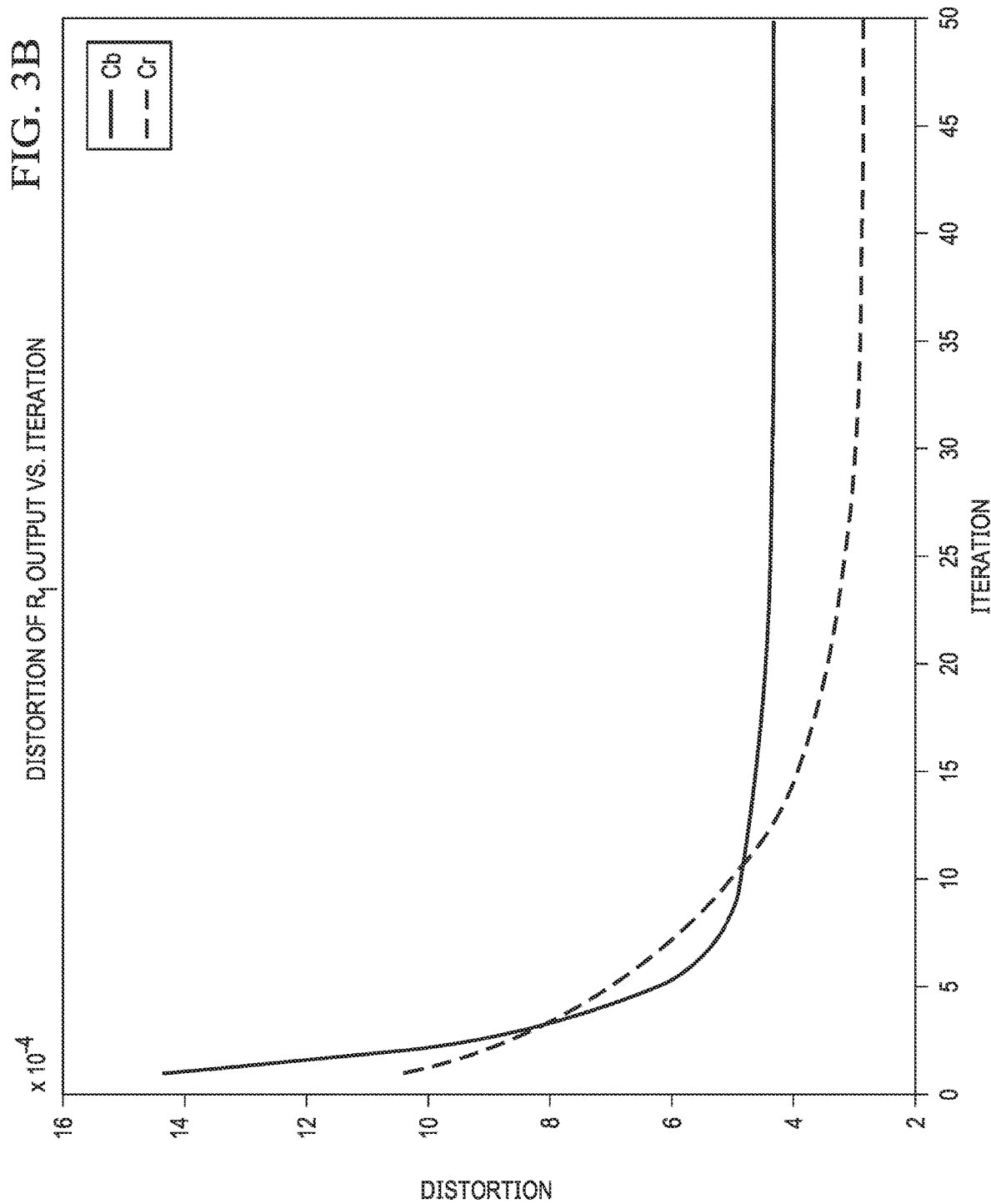

FIG. 3A illustrates example distortions in a first reshaped SDR video signal (or a reshaped SDR image therein) outputted from the first reshaping function, $R_0$, in each iteration of an iterative optimization algorithm/method used to construct reshaping functions in a pipeline of chained reshaping functions as illustrated in FIG. 2B. FIG. 3B illustrates example distortions in a reshaped HDR video signal (or a reshaped HDR image therein) outputted from the second reshaping function, $R_1$, in each iteration of the iterative optimization algorithm/method.

As shown in FIG. 3B, the distortions in the reshaped HDR video signal outputted from the second reshaping function are gradually reduced when the number of iterations increases until saturating at or below a certain level. In contrast, as shown in FIG. 3A, the distortions in the reshaped SDR video signal outputted from the first reshaping function keep increasing when the number of iteration increases, without reaching saturation at or below a certain level.

To increase fidelity of intermediate reshaped video signal, reshaping coefficients before the number of iterations reaches the final round (or T iterations) may be taken or used to define or specific reshaping functions in the pipeline of chained reshaping functions. In other words, reshaping coefficients at iteration $t^{opt}$, where $t^{opt}<T$, may be taken instead of completing the iterative optimization algorithm/method illustrated in TABLE 2 till the final round (or T iterations).

In a first example, an objective method can be used to select or pick an optimal number of iterations $t^{opt}$. A convergence curve depicting distortions over iterations such as illustrated in FIG. 3A and FIG. 3B can be used to identify, select or pic a specific iteration index (or the optimal number of iterations $t^{opt}$) having the best trade-off between distortions in the first reshaped video signal outputted from the first reshaping function $R_0$ and distortions in the second reshaped video signal outputted from the second reshaping function $R_1$. For example, the R distortions as illustrated in FIG. 3B starts to saturate around at a specific number of iterations such as iteration #8—which is a knee point on the $R_1$ convergence curve. This knee point can be identified or found where the $R_1$ convergence curve has the largest first derivative change in absolute value (or the largest second derivative in absolute value or magnitude). As illustrated in FIG. 3A, the $R_0$ distortions as illustrated in FIG. 3A also has a relatively small distortion at the specific number of iteration (or iteration 8 in this example) on the $R_0$ convergence curve.

In a second example, a subjective method can be used to select or pick an optimal number of iterations $t^{opt}$. For example, each set of reshaping coefficients generated or obtained at each iteration may be applied to a batch of test images to generate reshaped images that can be reviewed by users (or humans) to help determine the best tradeoff among different reshaped video signals subjectively. Some of these operations may be performed manually while some others of these operations may be performed automatically.

Inverse Gradient-Based Algorithm

In some operational scenarios, as a part of backward reference signal modification, inverse gradient can be computed for a (e.g., each, etc.) reshaping function in a pipeline of chained reshaping functions, for example by giving a (e.g., relatively small, etc.) input difference in the input video signal (or an input image therein) to the reshaping function and measuring the output difference caused in the reshaped video signal (or an output image therein) outputted by the reshaping function. The ratio between the input and output difference can be defined or used as the inverse gradient for the reshaping function.

For example, for each pixel, an input difference denoted as A can be added in (pre-delta-added) pixel values ($s_{<k>,i}^{(t)y}$, $s_{<k>,i}^{(t)c0}$, $s_{<k>,i}^{(t)c1}$) of the input image for each channel, as follows:

$$\left(s'^{(t)y}_{(k),i}, s'^{(t)c0}_{(k),i}, s'^{(t)c1}_{(k),i}\right) = \left(s^{(t)y}_{(k),i} + \Delta, s^{(t)c0}_{(k),i} + \Delta, s^{(t)c1}_{(k),i} + \Delta\right) \quad (16)$$

where the left hand side (LHS) are delta-added pixel values.

The reshaping function can be applied to pixels of the input image to generate the output difference in the reshaped video signal outputted from the reshaping function.

The MMR expanded form for the i-th pixel of the input image for the delta-added pixel values ($s'^{(t)y}_{<k>,i}$, $s'^{(t)c0}_{<k>,i}$, $s'^{(t)c1}_{<k>,i}$) may be give as follows:

$$\vec{s}'^{(t)}_{(k),i} = \left[1 \ s'^{(t)y}_{(k),i} \ s'^{(t)c0}_{(k),i} \ s'^{(t)c1}_{(k),i} \ \ldots \right. \quad (17)$$

$$\left. s'^{(t)y}_{(k),i} s'^{(t)c0}_{(k),i} \ \ldots \ \left(s'^{(t)y}_{(k),i} s'^{(t)c0}_{(k),i}\right)^2 \ \ldots \ \left(s'^{(t)c0}_{(k),i}\right)^2 \left(s'^{(t)c1}_{(k),i}\right)^2 \ \ldots \right]$$

MMR expanded forms for all pixels can be collected in a matrix form as follows:

$$S'^{(t)}_{(k)} = \begin{bmatrix} \vec{s}'^{(t)}_{(k),0} \\ \vec{s}'^{(t)}_{(k),1} \\ \vdots \\ \vec{s}'^{(t)}_{(k),P-1} \end{bmatrix} \quad (18)$$

The output differences in the reshaping video signal (or the reshaped image therein) can be represented or computed as follows:

$$\Delta s^{(t),ch}_{(k+1)} = S'^{(t)}_{(k)} m^{(t),ch,opt}_{(k)} - s^{(t),ch}_{(k+1)} \quad (19)$$

An inverse gradient can be computed for each pixel as follows:

$$g^{(t),ch}_{(k+1),i} = \begin{cases} \dfrac{\Delta}{\Delta s^{(t),ch}_{(k+1),i}}, & \text{if } \Delta s^{(t),ch}_{(k+1),i} \neq 0 \\ 0, & \text{if } \Delta s^{(t),ch}_{(k+1),i} = 0 \end{cases} \quad (20)$$

The inverse gradient $g_{<k+1>,i}^{(t),ch}$ can be used along with a computed error $e_{<k+1>}^{(t),ch}$ between the reshaped video signal (or the reshaped image therein) and its reference video signal (or a reference image therein) to generate an updated reference video signal for the next iteration as a part of the backward reference signal modification, as follows:

$$r_{\langle k \rangle}^{(t+1),ch} = r_{\langle k \rangle}^{(t),ch} + f\left(g_{\langle k+1 \rangle}^{(t),ch} e_{\langle k+1 \rangle}^{(t),ch}\right) \quad (21)$$

An encoding procedure/method/flow similar to that illustrated in TABLE 2 can be used to generate or construct reshaping functions in a pipeline of chained reshaping function, albeit with different reference video signals updated in expressions above.

Constrained Optimization

As illustrated in FIG. 3A, unconstrained optimization in an intermediate reshaped video signal—or optimizing the intermediate reshaped video signal with no constraints or limits—may result in divergence for distortions. Constrains can be implemented in a reshaping function optimization process as described herein to improve or ensure fidelity of intermediate reshaped video signal(s) generated from a pipeline of chained reshaping functions constructed by the reshaping function optimization process.

In some operational scenarios, reshaping function optimization as described herein can be implemented or performed with hard constraint(s). Such optimization may be referred to as hard constrained optimization.

For example, the level of error correction for an intermediate reshaped video signal generated in a pipeline of chained reshaping functions can be constrained or controlled by placing limits/bounds on modifications to a reference video signal to which the intermediate reshaped video is to approximate or target, as follows:

$$r_{\langle k \rangle}^{(t+1),ch} = clip3\{r_{\langle k \rangle}^{(t),ch} + f(e_{\langle k+1 \rangle}^{(t),ch}), r_{\langle k \rangle}^{\prime ch,L}, r_{\langle k \rangle}^{\prime ch,H}\} \quad (22)$$

where $r_{<k>}^{ch,L}$ and $r_{<k>}^{ch,H}$ represent tolerated value change lower bound and upper bound, respectively. The tolerated value change lower and upper bounds can be set based on an actual codeword distribution or range in the reference video signal (or a reference image therein). Multiplicative/divisive scaling or ratio factors and/or additive/subtractive deltas can be used to set these upper and lower bounds in relation with group codeword values (e.g., max, min, average, medium, weighted average, etc.) determined from the actual codeword distribution or range in the reference video signal (or the reference image therein). Values for these factors and/or deltas can be proportional, fixed, etc. For example, the upper bound may be set to be (a) at or below the largest valid codeword value in a color space or a color channel therein; and (b) no more than 5% difference (or a fixed value) from the largest codeword determined in the reference image. Likewise, the upper bound may be set to be (a) at or above the smallest valid codeword value in the color space or the color channel therein; and (b) no more than 5% difference (or a fixed value) from the smallest codeword determined in the reference image.

An encoding procedure/method/flow similar to that illustrated in TABLE 2 can be used to generate or construct reshaping functions in a pipeline of chained reshaping function, albeit with bounded modifications to reference video signals—for intermediate reshaped video signals to approximate or target—in expression (22) above.

It has been observed that a change in saturated color is more noticeable than a change in neutral color. Hence, changes to saturated colors in an intermediate reshaped video signal can be avoided, limited, bounded or otherwise attenuated.

Signal modifications that affect those saturated colors can be made with relatively small or low extent or degree, while signal modifications that affect non-saturated colors such as neutral colors can be made with relatively large or high extent or degree.

In some operational scenarios, reshaping function optimization as described herein can be implemented or performed using saturation-constrained weighted algorithm or method.

For example, a weighting factor for each pixel can be set for an (entire) reshaping function optimization process. A saturation (value) for each pixel in the final reference video signal $r_{<K>}$ (or a final reference image therein) can be computed and held unchanged in the (entire) reshaping function optimization process, as follows:

$$\theta_i = \left(s_{\langle k \rangle, i}^{c0} - 0.5\right)^2 + \left(s_{\langle k \rangle, i}^{c1} - 0.5\right)^2 \quad (23)$$

The saturation (value) for the pixel as shown in expression (23) above can be converted into, or can be used to construct, a weighting factor for the pixel (or a corresponding pixel in an intermediate reshaped video signal) via a non-linear decreasing function or functional form, as follows:

$$w_i = \exp\left(-\frac{\theta_i}{\sigma}\right) \quad (24)$$

where represents a weighting factor function parameter. An example value of $\sigma$ may be 0.01, 0.011, etc.

Weighting factors for pixels can be used in modifying reference video signal(s) to which intermediate reshaped video signal(s) approximate. Using these weighting factors, the less saturation a pixel has, the higher amount(s) of modification to pixel value(s) for the pixel are. In other words, a higher saturation pixel is allowed to have relatively small amount(s) of modification, thereby helping ensure a relatively high fidelity of both saturated color pixels and neutral color pixels in the intermediate reshaped video signals.

A reference signal modification function can be defined with weighting factors as follows:

$$f(e_{\langle k+1 \rangle, i}^{(t),ch}) = \min\{(|e_{\langle k+1 \rangle, i}^{(t),ch}| > \varepsilon)? \alpha^{ch} \cdot w_i \cdot e_{\langle k+1 \rangle, i}^{(t),ch} : 0, \lambda\} \quad (25)$$

An encoding procedure/method/flow similar to that illustrated in TABLE 2 can be used to generate or construct reshaping functions in a pipeline of chained reshaping function, albeit with saturation weighted modifications to reference video signals—for intermediate reshaped video signals to approximate or target—in expression (25) above.

FIG. 3C illustrates example distortions in a first reshaped SDR video signal (or a reshaped SDR image therein) outputted from the first reshaping function, $R_0$, in each iteration of an iterative saturation weighted optimization algorithm/method used to construct reshaping functions in a pipeline of chained reshaping functions as illustrated in FIG. 2B. FIG. 3D illustrates example distortions in a reshaped HDR video signal (or a reshaped HDR image therein) outputted from the second reshaping function, $R_1$, in each iteration of the iterative saturation weighted optimization algorithm/method.

As shown in FIG. 3D, the distortions in the reshaped HDR video signal outputted from the second reshaping function are gradually reduced when the number of iterations increases until saturating at or below a certain level. As shown in FIG. 3C, the distortions in the reshaped SDR video signal outputted from the first reshaping function keep increasing when the number of iteration increases, reach a peak around iteration #15, and then start to decrease to near a saturated point. Hence, the distortions in the reshaped HDR and SDR video signals of both HDR and SDR reshaping functions are converged. In addition, there is no large or significant increase in the distortions in the constrained (e.g., saturation weighted constraints, etc.) optimization as illustrated in FIG. 3C and FIG. 3B as compared with the distortions in the unconstrained optimization as illustrated in FIG. 3A and FIG. 3B.

Prior Knowledge Incorporated Optimization

In some operational scenarios, reshaping function optimization as described herein can be incorporated prior knowledge about different color grades (or reshaped video signals) that are to be generated from a pipeline of chained reshaping functions. Hence, a prior-knowledge incorporated (or constrain based) algorithm/method can be implemented to incorporate such prior knowledge for the purpose of generating or constructing reshaping functions in the pipeline of chained reshaping functions.

For example, data ranges—representing a proper subset of the entire data ranges of codeword values in an input color space or domain used to encode or represent input content—of actually used codeword values in encoding/representing the input content may be available as prior information or knowledge. This prior knowledge about the data ranges can be implemented as constraint in reshaping function optimization as described herein and used to facilitate a transformation of the input content from the color space or domain to intermediate or final content in a different color space or domain.

By way of illustration but not limitation, one or more (additional) reshaping functions can be implemented into a pipeline of chained reshaping functions to account for transformations/constraints based on prior knowledge of the data ranges. These (additional) reshaping functions can be either fixed with no reshaping function parameter to be optimized or configurable with only a subset of relatively small number (e.g., one, two, etc.) of reshaping function parameters—among all reshaping function parameters—to be optimized. Similarly, output data ranges can also be similarly known as prior knowledge and used to implement constraint/transformation at or near the last stage of pipeline of chained reshaping functions with fixed reshaping function(s) or reshaping functions with only a subset of reshaping parameters configurable.

Figure 2C:
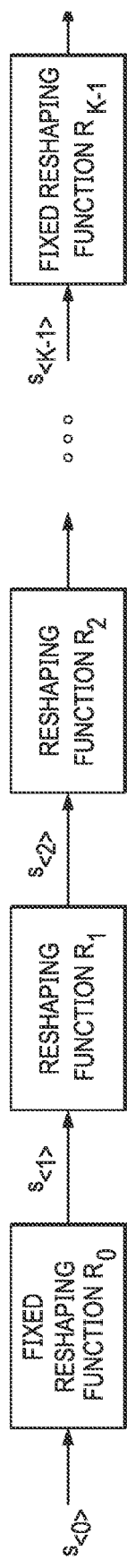

FIG. 2C illustrates an example prior-knowledge incorporated pipeline of chained reshaping functions. A subset of these chained reshaping functions can be generated or constructed using optimization methods or procedures with constraints or transformations as described herein.

As illustrated in FIG. 2C, an (original) input video signal (or an input image therein) $s_{<0>}$ represented/encoded in an input color space (or an input domain) is provided as input to the pipeline of chained reshaping functions. The pipeline of chained reshaping functions comprise K reshaping functions concatenated together, where K is an integer greater than one (1). These K reshaping functions include two fixed reshaping functions $R_0( )$ and $R_{K-1}( )$ at the two ends of the pipeline of chained reshaping functions. Each of the fixed reshaping functions $R_0( )$ and $R_{K-1}( )$ may have either no reshaping function parameter to be optimized or a subset of a relatively small number of reshaping function parameters to be optimized. These K reshaping functions also include the subset of the chained reshaping functions such as $R_1( )$ and $R_2( )$ to be optimized or constructed by reshaping function optimization as described herein.

Figure 2D:
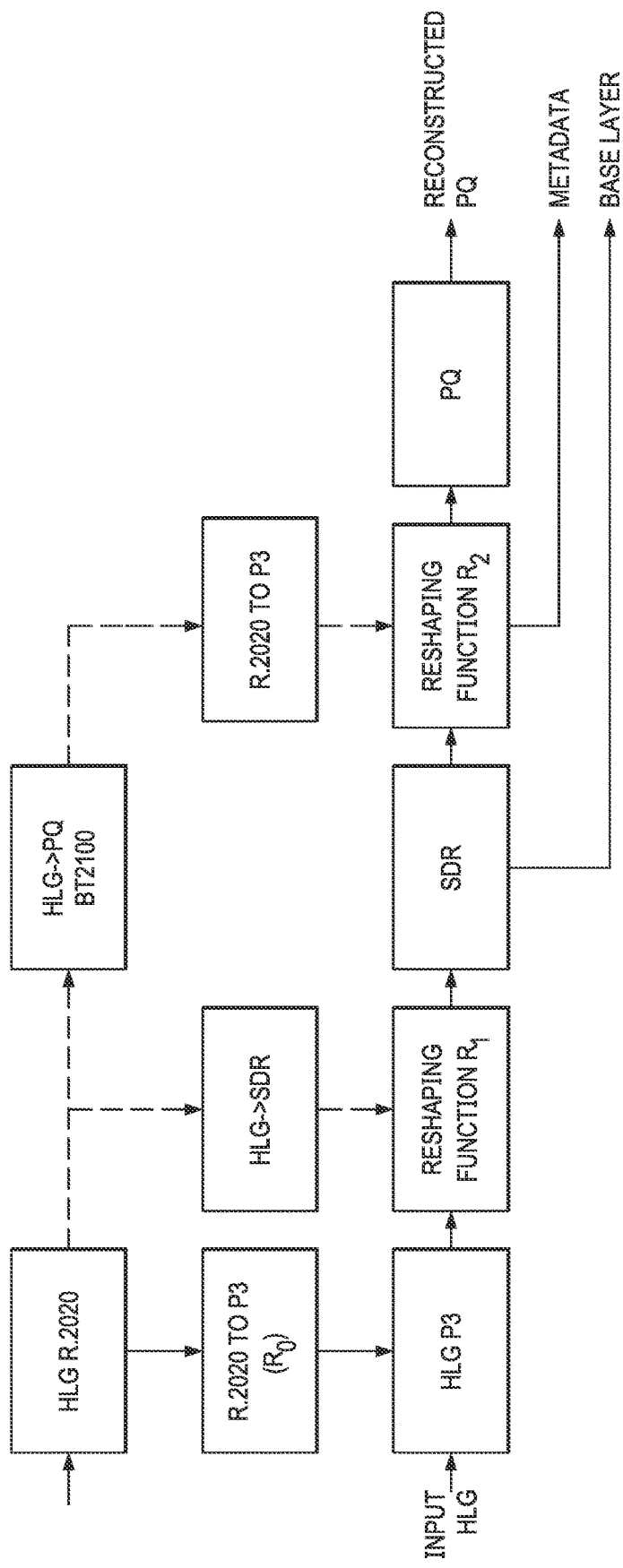

FIG. 2D illustrates an example (specific) prior-knowledge incorporated pipeline of chained reshaping functions, which may be used to implement conversion from HLG backward compatible codec to SDR backward compatible codec as previously mentioned.

As shown in FIG. 2D, prior knowledge about data range(s) or max color represented in input content—such as an input video signal (or an image therein) captured by a mobile phone camera in applicable use cases—may be incorporated in reshaping function optimization. Based on prior knowledge, data range(s) or max color of images in the input content captured in existing mobile phone camera may be known to be a P3 color space or domain, while the input video signal comprising the images may be known to be stored in HLG R.2020 image data container (or HLG R.2020 color space or domain) with much larger data range(s) or max color than the P3 color space or domain actually used in the captured/stored images. SMPTE EG 432-1:2010 "Digital Source Processing—Color Processing for D-Cinema" (Nov. 10, 2010) and SMPTE RP 431-2:2011 "D-Cinema Quality—Reference Projector and Environment" (Apr. 6, 2011), which are incorporated herein by reference in its entirety, describe an example P3 color space.

Optimized reshaping function parameter values—defining or specifying reshaping functions in the pipeline of chained reshaping function—can be generated or constructed with this constraint or prior knowledge in the input content to improve the performance (e.g., reshaped signal fidelity improvement, prediction error reduction, etc.) of the reshaping functions in the entire pipeline of chained reshaping functions.

For example, as illustrated in FIG. 2D, the constraint of the data range(s) or max color in the input content can be enforced by way of a fixed reshaping function such as the first reshaping function $R_0$ that implements a transformation of the input content (nominally) in the HLG R.2020 color space (or domain) to a P3 color space (or domain).

A SDR reference video signal (or an SDR image therein) can be derived or converted from the input HLG R.2020 signal using an HLG-to-SDR API or toolkit.

The second reshaping function R/in the pipeline of chained reshaping functions receives two inputs—(1) the SDR reference video signal (or the SDR image therein) and (2) the reshaped HLG P3 video signal (or a reshaped HLG P3 image therein) and tries to approximate the SDR reference video signal (or the SDR image) by reshaping the reshaped HLG P3 video signal (or the reshaped HLG P3 image therein) via a prediction model represented by the second reshaping function $R_1$ into a reshaped SDR video signal—denoted as SDR in FIG. 2D—or (a reshaped SDR image therein).

An intermediate PQ signa in the R.2020 color space (or domain) can be derived or converted from the input HLG R.2020 video signal using a video codec such as HLG backward compatible codec or using other video codecs implementing relevant video coding standards or profiles defined therein such as BT.2100 standard.

The intermediate PQ signa in the R.2020 color space (or domain) can then be reshaped—by way of a fixed reshaping function such as the first reshaping function $R_0$ that implements a transformation of the input content (nominally) in the HLG R.2020 color space (or domain) to a P3 color space (or domain)—into a reference PQ video signal represented in the P3 color space (or domain).

The third reshaping function $R_2$ in the pipeline of chained reshaping functions receives two inputs—(1) the reference PQ video signal represented in the P3 color space (or domain) and (2) the reshaped SDR video signal (or a reshaped SDR image therein) outputted from the second reshaping function $R_1$—and tries to approximate the reference PQ video signal (or the reference PQ image therein) by reshaping the reshaped SDR video signal (or the reshaped SDR image therein) via a prediction model represented by the third reshaping function $R_2$ into a reconstructed or reshaped PQ video signal —denoted as PQ in FIG. 2D—or (a reconstructed or reshaped PQ image therein) in the P3 color space or domain.

As shown, the reshaped SDR video signal outputted from the second reshaping function $R_1$ may be encoded/represented as base layer image data in a video signal. Reshaping function parameters such as those specifying the third reshaping function $R_2$ can be included as a part of image metadata included in the video signal and used by a recipient device of the video signal to reconstruct or reshape the SDR video signal represented in the base layer image data of the video signal into the reconstructed or reshaped PQ video signal with reconstructed PQ image(s).

In some operational scenarios, the expected final output video signal may be a reconstructed or reshaped PQ R.2020 video signal. The reconstructed PQ video signal generated from the third reshaping function $R_2$ can be further transformed by a fixed reshaping function or transformation from the P3 color space or domain to the R.2020 color space or domain. Additionally, optionally or alternatively, the fixed reshaping function or transformation from the P3 color space or domain to the R.2020 color space or domain can be combined into or encapsulated as a part of an overall transformation (e.g., LMS transform or transformation, etc.) from the P3 color space or domain to another color space or domain such as an LMS color space or domain. The combination or encapsulation of the fixed reshaping function or transformation from the P3 color space or domain to the R.2020 color space or domain into the overall transformation can be signaled from an upstream encoding device to a downstream recipient decoding device, for example via the image metadata or display management (DM) metadata included therein.

Denote the index of the first (non-fixed) reshaping function to be optimized as $k_s$, where $k_s > 0$, and the index of the last (non-fixed) reshaping function to be optimized as $k_e$, where $k_e < K-1$. An example reshaping function optimization procedure that incorporates prior knowledge with or without previously discussed constraints is illustrated in TABLE 3 below.

TABLE 3

Input signal: $s_{<0>}^{(0)}$
Initialize reference signal: $r_{<k+1>}^{(0)} = r_{<k+1>}$ where k=0, ..., K−1
for t = 0 to T−1
  // forward TABLE 3-continued for k = ks to $k_e$
  // prepare input signal and reference output signal from reshaping function k
  $\{ s_{<k>}^{(t)}, r_{<k+1>}^{(t)} \}$
  // solve optimal reshaping coefficients
  Construct $S_{<k>}^{(t)}$ and $r_{<k+1>}^{ch}$
  $m_{<k>}^{(t),ch,opt} = ((S_{<k>}^{(t)})^T (S_{<k>}^{(t)}))^{-1} ((S_{<k>}^{(t)})^T r_{<k+1>}^{ch})$
  // construct the predicted signal from reshaping function
  $s_{<k+1>}^{(t),ch} = S_{<k>}^{(t)} m_{<k>}^{(t),ch,opt}$
end
// backward
for k= $k_e$ to ks + 1
  // compute the output error
  $e_{<k+1>}^{(t),ch} = r_{<k+1>}^{(k),ch} - s_{<k+1>}^{(t),ch}$
  // modify the reference signal for previous function
  $r_{<k>}^{(k+1),ch} = r_{<k>}^{(k),ch} + f(e_{<k+1>}^{(t),ch})$
end
end FIG. 3E illustrates example distortions (or a convergence curve) for the second reshaping function $R_1$ of FIG. 2D that generates the reshaped SDR video signal. FIG. 3F illustrates example distortions (or a convergence curve) for the third reshaping function $R_2$ of FIG. 2D that generates the reshaped PQ (or HDR) video signal.

Example Process Flows

Figure 4A:
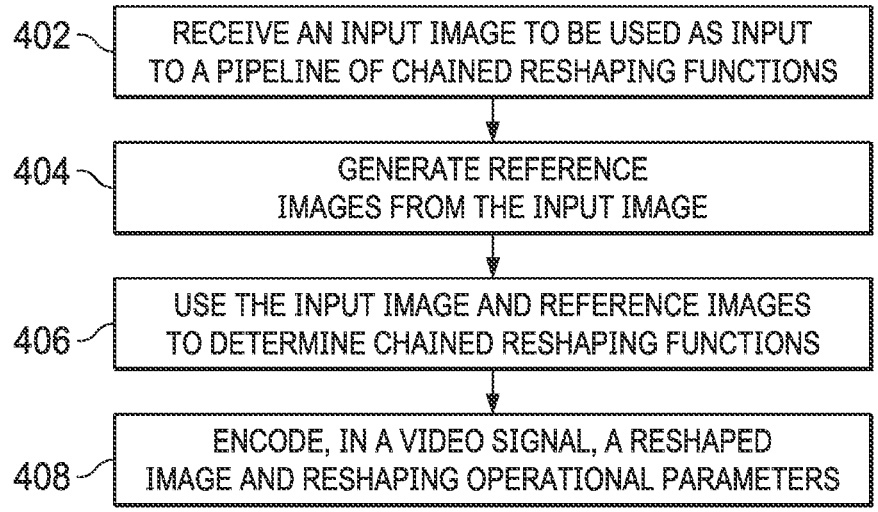
FIG. 4A and FIG. 4B illustrate example process flows.

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system receives an input image of an input video signal to a pipeline of chained reshaping functions. The pipeline of chained reshaping functions includes a chain of reshaping functions.

In block 404, the image processing system generates two or more reference images for two or more reference color grades from the input video signal. Each reference image in the two or more reference images corresponds to a respective reference color grade in the two or more reference color grades.

In block 406, the image processing system uses the input image and the two or more reference images to determine two or more sets of operational parameters for two or more chained reshaping functions in the pipeline of chained reshaping functions. Each set of operational parameters specifies a respective chained reshaping function in the two or more chained reshaping functions. Each chained reshaping function in the two or more chained reshaping functions is used to generate a respective reshaped image in two or more reshaped images in two or more reshaping color grades.

In block 408, the image processing system encodes a selected reshaped image in a selected reshaping color grade, among the two or more reshaped images in the two or more reshaping color grades, in a video signal along with image metadata. The image metadata includes one or more sets of operational parameters for one or more chained reshaping functions among the two or more chained reshaping functions. A recipient device of the video signal is caused to use the image metadata and the selected reshaped image to generate a reconstructed image of a reshaping color grade other than the selected reshaping color grade.

In an embodiment, the video signal represents a single-layer backward compatible signal.

In an embodiment, the input video signal corresponds to a first video coding profile; the two or more reshaped color grades correspond to one or more second video coding profiles each of which is different from the first video coding files.

In an embodiment, the two or more second video coding profiles include at least one video coding profile supported by one or more of: iOS devices, Android devices, tablet computers, laptop computers, desktop computers, user devices of different display capabilities, and so on.

In an embodiment, the input image, the two or more reference images and the two or more reshaped images include at least one of: a 8-bit image, a 10-bit image, a 12-bit image, a hybrid log gamma (HLG) image, a perceptual quantized (PQ) image, a high dynamic range (HDR) image, a standard dynamic range (SDR) image, an extended dynamic range (EDR) image, an image represented in a Rec. 2020 color space, an image represented in a Rec. 2100 color space, an image represented in a P3 color space, etc.

In an embodiment, the set of operational parameters that specifies the respective chained reshaping function is determined by minimizing prediction errors between a reshaped image generated with the respective chained reshaping function and a corresponding reference image in the two or more reference images.

In an embodiment, the two or more sets of operational parameters that respectively specify the two or more chained reshaping functions are determined by a total number of iterations by minimizing prediction errors between each of the two or more reshaped images respectively generated with the two or more chained reshaping functions and a corresponding reference image in the two or more reference images; the total number is selected from one of: a fixed iteration number, an iteration number corresponding to a knee point in distortions represented by the prediction errors, or an iteration number selected based at least in part on user input.

In an embodiment, the total number of iterations comprises a first iteration in which a subset of prediction errors in the prediction errors is generated; the subset of prediction errors in the first prediction errors is used to modify the two or more reference images used for a second iteration after the first iteration.

In an embodiment, codewords in the two or more reference images are modified with one of: inverse gradients computed from the subset of prediction errors, hard constraints used to limit modifications to the codewords, soft constraints used to limit modifications to relatively saturated codewords among the codewords, etc.

In an embodiment, the pipeline of chained reshaping functions includes a fixed reshaping function that is determined based at least in part on prior knowledge about at least one of the input video signal and the two or more reference color grades.

In an embodiment, the two or more reshaping color grades generated by the pipeline of chained reshaping functions include a final reshaping color grade that approximates a final reference color grade in the two or more reference color grades; the final reference color grade is different from the input video signal in at least one of: bit depth, dynamic range, color space, spatial resolution, domain, video coding profile, etc.

Figure 4B:
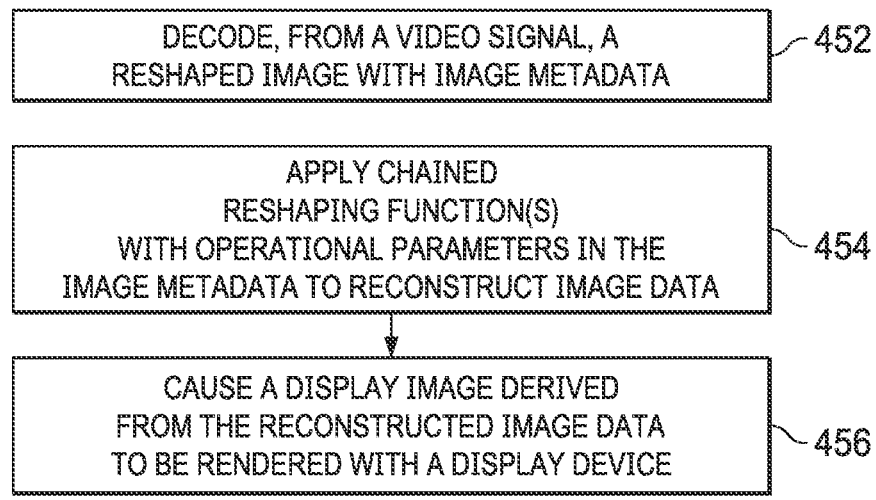

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 452, an image processing system decodes a reshaped image in a reshaping color grade, along with image metadata, from a video signal. The image metadata includes one or more sets of operational parameters that respectively specify one or more chained reshaping functions in a pipeline of chained reshaping functions.

In block 454, the image processing system applies at least one of the one or more chained reshaping functions to the reshaped image decoded from the video signal to generate a second reshaped image in a second reshaping color grade.

In block 456, the image processing system renders, on a display device, a display image generated from the second reshaped image.

In an embodiment, the one or more sets of operational parameters specify one or more of: a multiple piece polynomial, a one-dimensional lookup table (1DLUT), a three-dimensional lookup table (3DLUT), a cross-color channel predictor, a multiple color channel multiple regression (MMR) predictor, a predictor with B-Spline functions as basis functions, a tensor product B-spline (TPB) predictor, etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
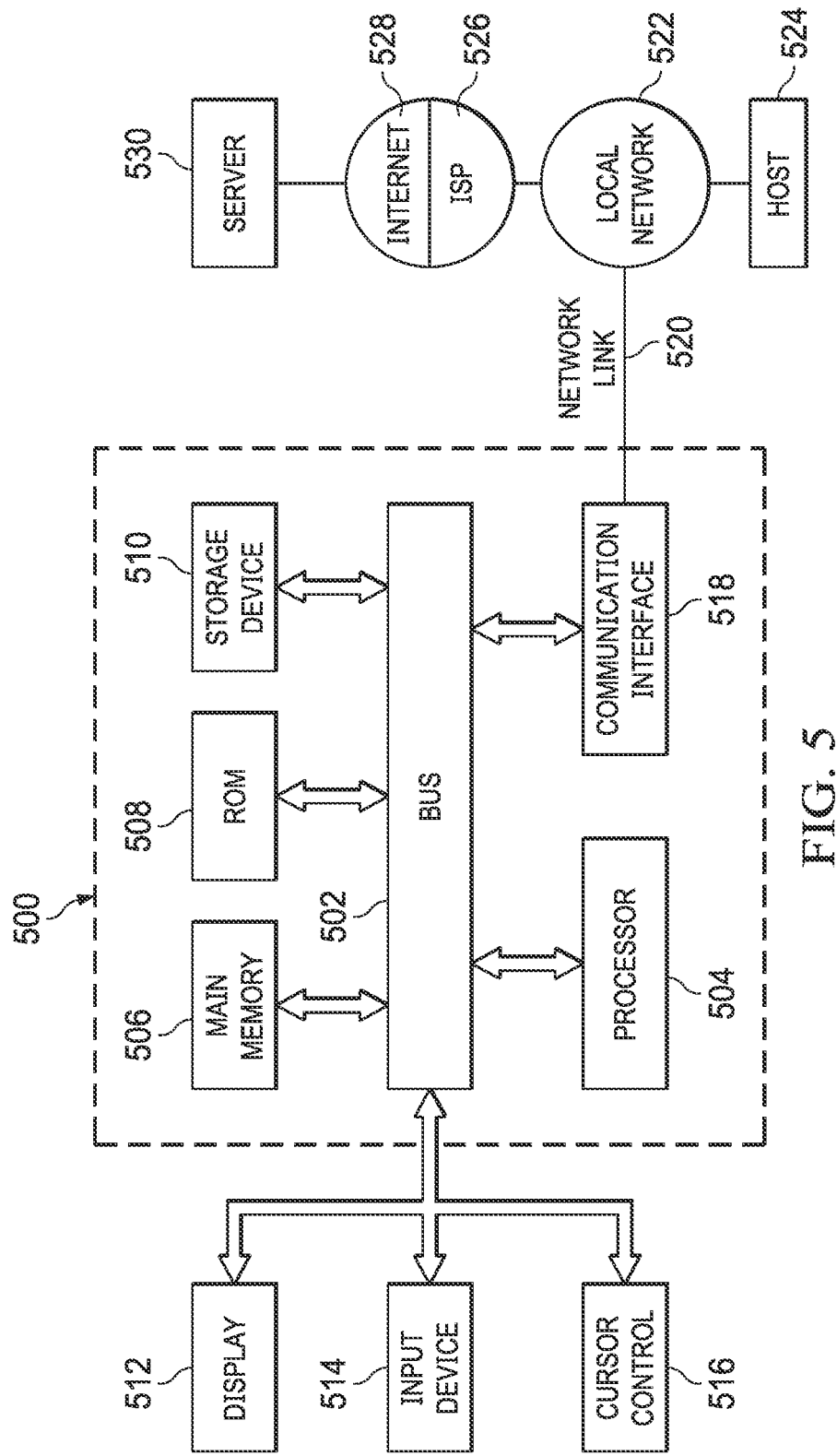
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
receiving an input image of an input video signal as input to a pipeline of chained reshaping functions, the pipeline of chained reshaping functions including a chain of reshaping functions;
generating two or more reference images for two or more reference color grades from input image of the input video signal, each reference image in the two or more reference images corresponding to a respective reference color grade in the two or more reference color grades, the two or more reference color grades differing from each other and from the color grade of the input image;
using the input image and the two or more reference images to determine two or more sets of operational parameters for two or more chained reshaping functions in the pipeline of chained reshaping functions, each set of operational parameters specifying a respective chained reshaping function in the two or more chained reshaping functions such that each chained reshaping function in the two or more chained reshaping functions generates a respective reshaped image in two or more reshaped images in two or more reshaping color grades, each of the two or more reshaping color grades being the same or approximating a corresponding one of the two or more reference color grades;
encoding a selected reshaped image in a first reshaping color grade, among the two or more reshaped images in the two or more reshaping color grades, in a video signal along with image metadata, the first reshaping color grade corresponding to a first chained reshaping function that generates the selected reshaped image in the first reshaping color grade, the image metadata including one or more sets of operational parameters for a second or more chained reshaping functions among the two or more chained reshaping functions, the second or more chained reshaping functions following the first reshaping function in the chain of reshaping functions, the second or more chained reshaping functions generating a reconstructed image of the second reshaping color grade, a recipient device of the video signal being caused to use the image metadata and the selected reshaped image to generate a reconstructed image of the second reshaping color grade.

2. The method of claim 1, wherein the video signal represents a single-layer backward compatible signal.

3. The method of claim 1, wherein the input video signal corresponds to a first video coding profile; wherein the two or more reshaped color grades correspond to one or more second video coding profiles each of which is different from the first video coding profiles.

4. The method of claim 3, wherein the two or more second video coding profiles include at least one video coding profile supported by one or more of: iOS devices, Android devices, tablet computers, laptop computers, desktop computers, or user devices of different display capabilities.

5. The method of claim 1, wherein the input image, the two or more reference images and the two or more reshaped images include at least one of: a 8-bit image, a 10-bit image, a 12-bit image, a hybrid log gamma (HLG) image, a perceptual quantized (PQ) image, a high dynamic range (HDR) image, a standard dynamic range (SDR) image, an extended dynamic range (EDR) image, an image represented in a Rec 2020 color space, an image represented in a Rec 2100 color space, or an image represented in a P3 color space.

6. The method of claim 1, wherein the set of operational parameters that specifies the respective chained reshaping function is determined by minimizing prediction errors between a reshaped image generated with the respective chained reshaping function and a corresponding reference image in the two or more reference images.

7. The method of claim 1, wherein the two or more sets of operational parameters that respectively specify the two or more chained reshaping functions are determined by a total number of iterations by minimizing prediction errors between each of the two or more reshaped images respectively generated with the two or more chained reshaping functions and a corresponding reference image in the two or more reference images; wherein the total number is selected from one of: a fixed iteration number, an iteration number corresponding to a knee point in distortions represented by the prediction errors, or an iteration number selected based at least in part on user input.

8. The method of claim 7, wherein the total number of iterations comprises a first iteration in which a subset of prediction errors in the prediction errors is generated; wherein the subset of prediction errors in the first prediction errors is used to modify the two or more reference images used for a second iteration after the first iteration.

9. The method of claim 8, wherein codewords in the two or more reference images are modified with one of: inverse gradients computed from the subset of prediction errors, hard constraints used to limit modifications to the codewords, or soft constraints used to limit modifications to relatively saturated codewords among the codewords.

10. The method of claim 1, wherein the pipeline of chained reshaping functions includes a fixed reshaping function that is determined based at least in part on prior knowledge about at least one of the input video signal and the two or more reference color grades.

11. The method of claim 1, wherein the two or more reshaping color grades generated by the pipeline of chained reshaping functions include a final reshaping color grade that approximates a final reference color grade in the two or more reference color grades; wherein the final reference color grade is different from the input video signal in at least one of: bit depth, dynamic range, color space, spatial resolution, domain, or video coding profile.

12. A method comprising:
  decoding a reshaped image in a first reshaping color grade, along with image metadata, from a video signal, the image metadata including two or more sets of operational parameters, each set of operational parameters specifying a respective chained reshaping function in two or more chained reshaping functions such that each chained reshaping function in the two or more chained reshaping functions generates a respective reshaped image in two or more reshaped images in two or more second reshaping color grades, the two or more second reshaping color grades differing from each other and from the first reshaping color grade;

determining a second reshaping color grade in the two or more second reshaping color grades that matches the capabilities of a display device to render the reshaped image in the second reshaping color grade on the display device;

applying at least one of the two or more chained reshaping functions to the reshaped image decoded from the video signal to generate a second reshaped image in the second reshaping color grade;

rendering, on the display device, a display image generated from the second reshaped image.

13. The method of claim 12, wherein the one or more sets of operational parameters specify one or more of: a multiple piece polynomial, a one-dimensional lookup table (1DLUT), a three-dimensional lookup table (3DLUT), a cross-color channel predictor, a multiple color channel multiple regression (MMR) predictor, a predictor with B-Spline functions as basis functions, or a tensor product B-spline (TPB) predictor.

14. An apparatus comprising a processor and configured to perform the method recited in claim 1.

15. A non-transitory computer-readable storage medium having stored thereon computer-executable instruction for executing a method with one or more processors in accordance with the method recited in claim 1.

* * * * *